(12) United States Patent
Mathea

(10) Patent No.: US 12,138,854 B2
(45) Date of Patent: Nov. 12, 2024

(54) METHOD FOR PRODUCING A THREE-DIMENSIONAL SHAPED OBJECT BY MEANS OF LAYER-BY-LAYER MATERIAL APPLICATION

(71) Applicant: dp polar GmbH, Eggenstein-Leopoldshafen (DE)

(72) Inventor: Hans Mathea, Eggenstein-Leopoldshafen (DE)

(73) Assignee: 3D Systems GmbH, Morfelden-Walldorf (DE)

( * ) Notice: Subject to any disclaimer, the term of this patent is extended or adjusted under 35 U.S.C. 154(b) by 45 days.

(21) Appl. No.: 17/800,751

(22) PCT Filed: Feb. 19, 2021

(86) PCT No.: PCT/EP2021/054222
§ 371 (c)(1),
(2) Date: Aug. 18, 2022

(87) PCT Pub. No.: WO2021/165503
PCT Pub. Date: Aug. 26, 2021

(65) Prior Publication Data
US 2023/0109613 A1    Apr. 6, 2023

(30) Foreign Application Priority Data
Feb. 19, 2020    (DE) ............ 10 2020 001 068.7

(51) Int. Cl.
*B29C 64/153*    (2017.01)
*B29C 64/218*    (2017.01)
(Continued)

(52) U.S. Cl.
CPC .......... *B29C 64/153* (2017.08); *B29C 64/218* (2017.08); *B29C 64/40* (2017.08);
(Continued)

(58) Field of Classification Search
CPC ..... B29C 64/153; B29C 64/40; B29C 64/218; B33Y 10/00; B33Y 30/00; B33Y 70/00; B29K 2101/12; B29K 2105/251
See application file for complete search history.

(56) References Cited

U.S. PATENT DOCUMENTS

| 9,423,756 B2 | 8/2016 | Hanson et al. |
| 2004/0099983 A1 | 5/2004 | Dirscherl |

(Continued)

FOREIGN PATENT DOCUMENTS

| CN | 107708970 A | 2/2018 |
| CN | 108093627 A | 5/2018 |

(Continued)

*Primary Examiner* — Nahida Sultana
(74) *Attorney, Agent, or Firm* — The Webb Law Firm

(57) ABSTRACT

In the case of a method for producing a three-dimensional shaped object by means of layer-by-layer material application, a base surface for holding the three-dimensional shaped object, a liquid, flowable or powder-form first material that can solidify, a powder-form second material including thermoplastic powder particles, and a solvent are made available. From the first material, a negative mold layer having a cavity for a shaped-object layer to be produced is produced and solidified. The bottom of the cavity is charged to an electric potential having a first polarity, and the powder particles are charged to a potential having a second polarity. The powder particles are applied to a support surface that is positioned relative to the cavity in such a manner that the powder particles are transferred from the support surface into the cavity and form a shaped-object layer having a positive shape that matches the negative mold in this cavity. The shaped-object layer is sintered by means of the effect of heat. A planar surface is produced by means of material removal, which surface extends over the negative mold layer (Continued)

and the shaped-object layer. The above steps are repeated at least once. Afterward the negative mold layers are dissolved in the solvent.

20 Claims, 19 Drawing Sheets

(51) Int. Cl.
  *B29C 64/40* (2017.01)
  *B33Y 10/00* (2015.01)
  *B33Y 30/00* (2015.01)
  *B33Y 70/00* (2020.01)
  *B29K 101/12* (2006.01)
  *B29K 105/00* (2006.01)
(52) U.S. Cl.
  CPC ............... *B33Y 10/00* (2014.12); *B33Y 30/00* (2014.12); *B33Y 70/00* (2014.12); *B29K 2101/12* (2013.01); *B29K 2105/251* (2013.01)

(56) References Cited

U.S. PATENT DOCUMENTS

| | | |
|---|---|---|
| 2013/0295338 A1 | 11/2013 | Keating et al. |
| 2014/0257549 A1* | 9/2014 | Swartz .................. B33Y 50/02 |
| | | 700/119 |
| 2015/0266237 A1 | 9/2015 | Comb et al. |
| 2016/0243764 A1 | 8/2016 | Hays et al. |
| 2016/0368055 A1 | 12/2016 | Swaminathan et al. |
| 2017/0299973 A1 | 10/2017 | Frauens |
| 2018/0111322 A1 | 4/2018 | Mathea |
| 2021/0114308 A1* | 4/2021 | Hudelson ................ B22F 12/60 |

FOREIGN PATENT DOCUMENTS

| | | |
|---|---|---|
| DE | 102018008808 A1 | 5/2020 |
| JP | 2017105090 A | 6/2017 |
| JP | 2017515700 A | 6/2017 |
| WO | 2015105047 A1 | 7/2015 |

* cited by examiner

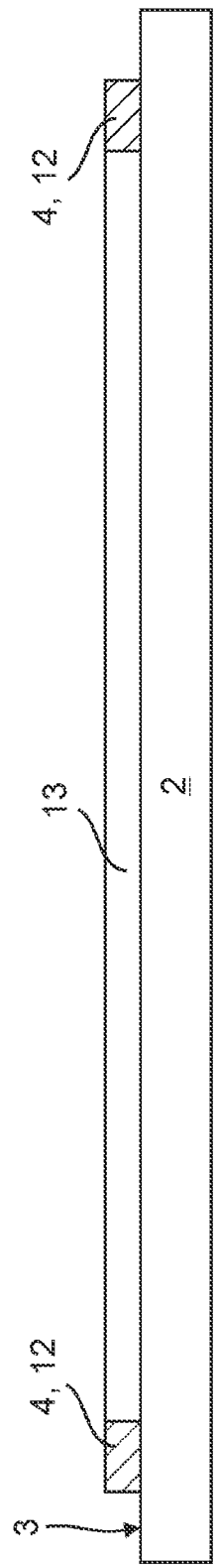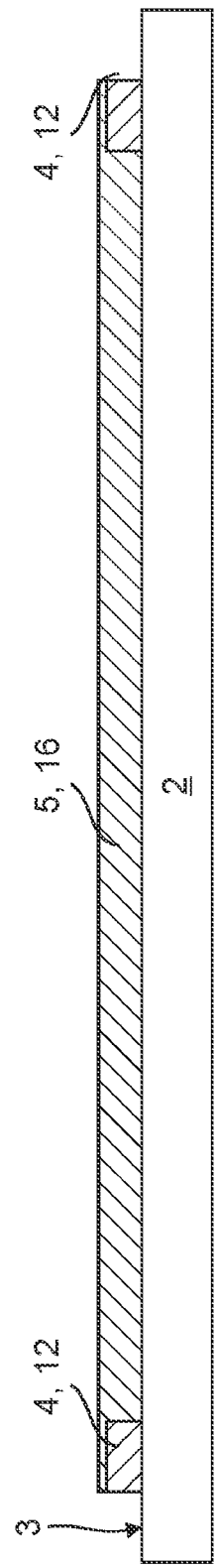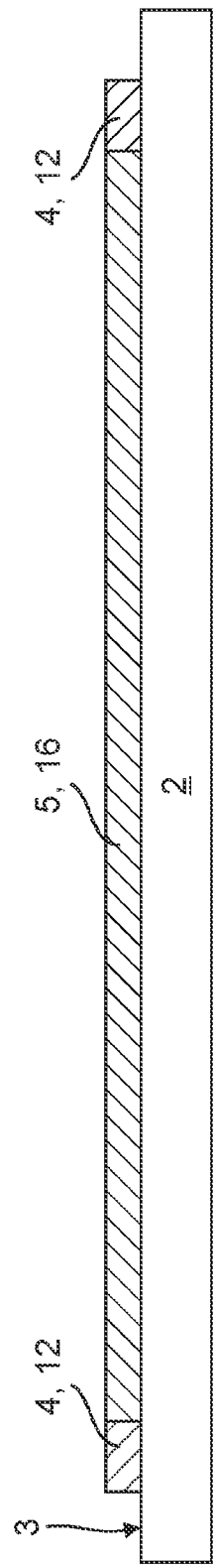

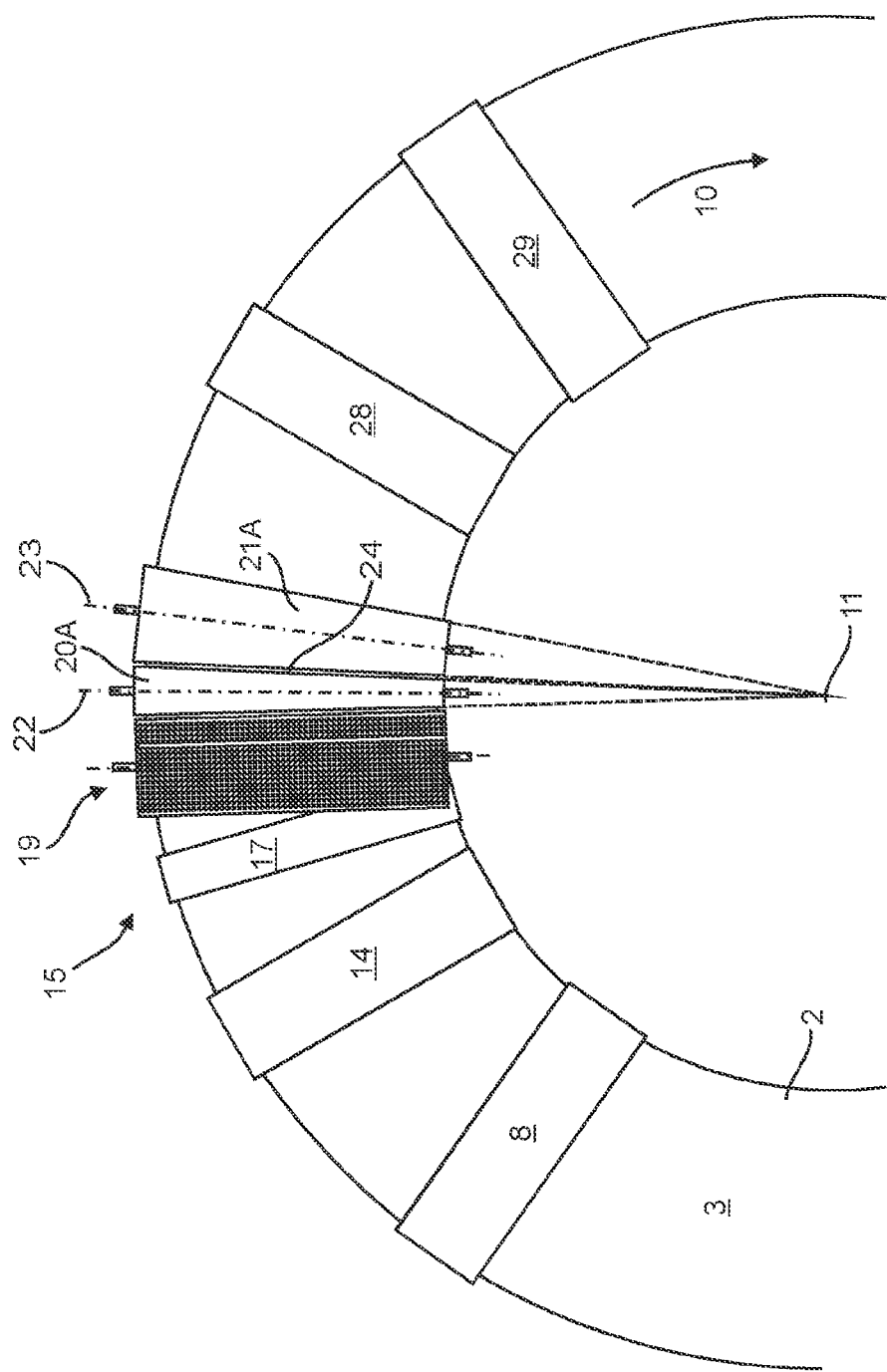

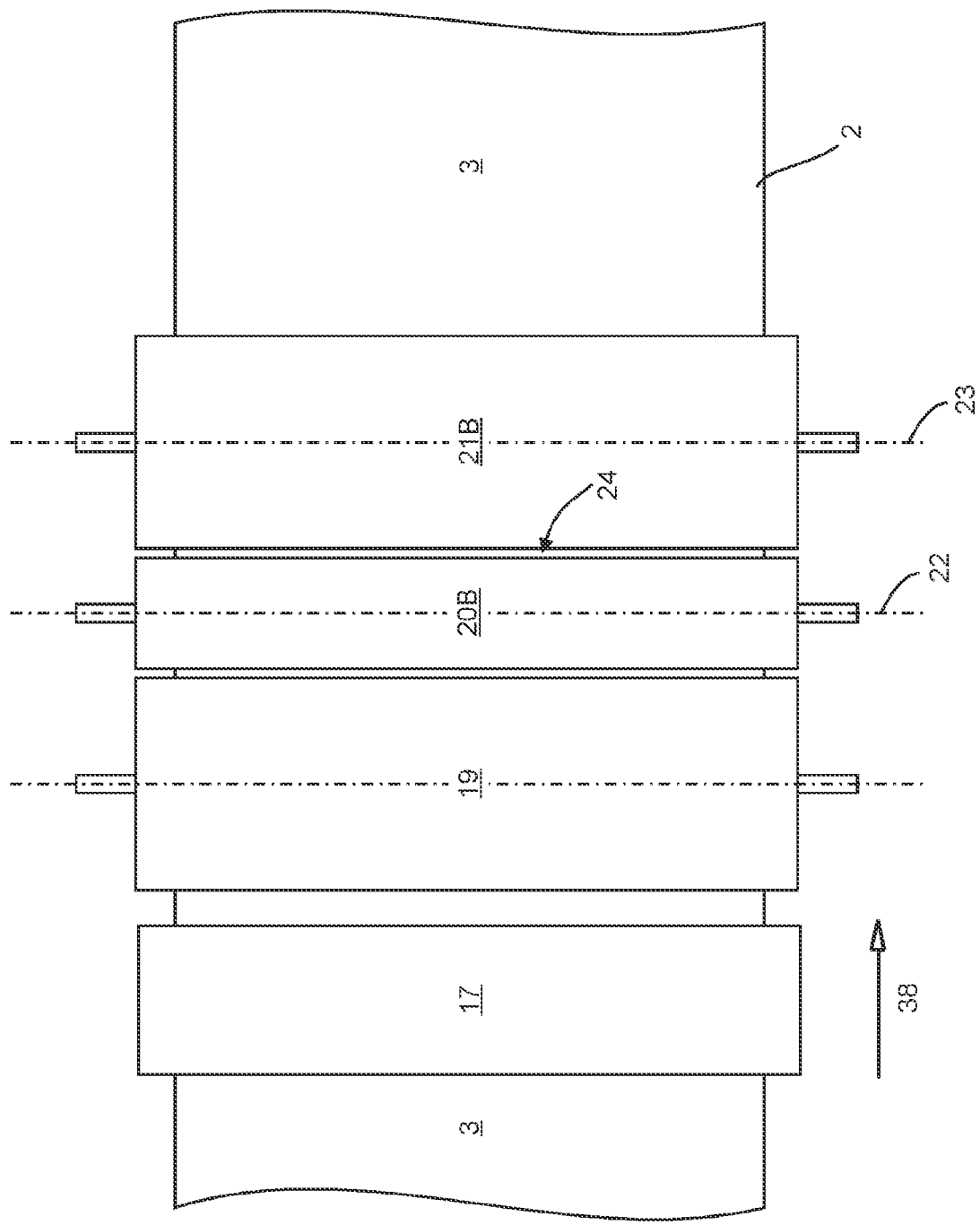

METHOD FOR PRODUCING A THREE-DIMENSIONAL SHAPED OBJECT BY MEANS OF LAYER-BY-LAYER MATERIAL APPLICATION

CROSS-REFERENCE TO RELATED APPLICATIONS

This application is the United States national phase of International Application No. PCT/EP2021/054222 filed Feb. 19, 2021, and claims priority to German Patent Application No. 10 2020 001 068.7 filed Feb. 19, 2020, the disclosures of which are hereby incorporated by reference in their entirety.

BACKGROUND OF THE INVENTION

Field of the Invention

The invention relates to a method for producing a three-dimensional shaped object by means of layer-by-layer material application, wherein geometry data for the shaped object, a support part having a base surface for holding the three-dimensional shaped object, a liquid, flowable or powder-form first material that can solidify, a liquid, flowable or powder-form second material that can solidify, preferably comprising thermoplastic powder particles, and a solvent in which the solidified first material can dissolve are made available.

Description of Related Art

In the case of such a method, known from practice, liquid polymers that can be solidified under the effect of ultraviolet radiation are used as the first and second material. In the case of the previously known method, first a first material layer is applied to a base surface of the support part, in that droplet-shaped material portions of the first and the second material are sprayed onto different locations of the base surface using an inkjet printer. The locations at which the material droplets composed of the different materials are applied to the base surface are selected as a function of geometry data made available for the shaped object to be produced, in such a manner that the regions of the material layer that consist of the second material form a lowermost layer of the shaped object to be produced. The first material serves as a support material that is applied to the base surface at locations where no second material is applied, and above which the shaped object has overhangs after application of a further material layer of the second material, which overhangs are supposed to be supported by the support material until solidification of all the material layers. Afterward, the lowermost material layer obtained in this manner is irradiated with ultraviolet radiation in a further step, so as to solidify polymers contained in the first and in the second material by means of cross-linking.

After the lowermost material layer has been completed, further material layers are applied to it in corresponding manner and solidified, until all the layers of the shaped object have been produced and solidified. Afterward, the layer stack obtained in this manner is brought into contact with the solvent until the first material has dissolved in it. The second material is not soluble in the solvent.

The previously known method does make it possible to produce three-dimensional shaped objects as prototypes or in small numbers, in a comparatively cost-advantageous manner. Good surface quality is made possible by means of the use of polymers that can be cross-linked using UV light, and due to the high resolution when printing. However, a very low viscosity of the polymers is required for high-resolution 3D printing, so that these can be applied to the base surface or to a solidified material layer situated on it through fine jets.

In the inkjet printing method (InkJet method), the jets can usually process a maximum viscosity of 25 mPa·s. Higher viscosities generally cannot be dispensed through jets. The objects produced from such materials are only able to withstand minimal stresses and can only serve as a display object.

From WO 2015/105047 A1, a method for producing a three-dimensional shaped object is known, in which the individual material layers are produced from at least three different materials, in each instance. During the production of the individual material layers, first an ink ejection step is carried out, in which a first and a second material that differs from it are applied to a base surface or to a solidified material layer situated on it by means of inkjet printing. The first material serves for producing a sacrificial layer that is soluble in a solvent and is supposed to support further layers to be applied to it.

The second material is used for producing a partial region of the shaped object that borders on the outer surface of the shaped object and is not soluble in the solvent. The second material is applied to a base surface or to a solidified material situated on it, in such a manner that the second material surrounds a cavity that is situated in the inner volume of the shaped object to be produced, at a distance from its surface.

After the first and the second material have been applied to the base surface or to the solidified material layer situated on it, a hardening step is carried out, during which the first and the second material are solidified. In this way, a sacrificial layer and an outer layer of the shaped object to be produced are obtained.

Afterward, the cavity is filled with a material composition that contains a water-soluble resin and porous powder particles. If the material composition is in the solid state, it is brought into a flowable state before being filled into the cavity, by means of heating it. The material composition can be introduced into the cavity using a doctor blade, by means of screen printing or by means of spin coating. The material composition filled into the cavity is planarized with the layer of the second material, so as to obtain a material layer that has a uniform thickness.

Afterward, a binder ink that contains a resin that can be hardened and can be the same as the first material is added to the material composition situated in the cavity. During this process the binder ink penetrates into the pores of the powder particles. Subsequently the resin is hardened. During this process, a bonded powder layer is formed, in which the hardened resin is anchored in the pores of the powder particles. According to the information in the Offenlegungsschrift [published patent application], in this way a great mechanical shaped object of the bonded powder layer is made possible. Furthermore the bonded powder layer is connected, by means of the resin, with the outer layer of the shaped object to be produced, which layer consists of the second material, to form a uniform layer.

In the previously known method, the steps mentioned above are repeated so as to produce further material layers in a corresponding manner. After all the material layers required for the shaped object have been completed and solidified, the first material is dissolved in the solvent so as to remove the sacrificial layers.

Since the outer layer of the shaped object is produced by means of applying material droplets using the inkjet method, and only the interior of the shaped object is produced from powder that is hardened, the method allows more precise structuring of the surface geometry of the shaped object as compared with a method in which the entire shaped object is produced from powder layers that are hardened. According to the information in the Offenlegungsschrift, furthermore a precise color design of the surface of the shaped object is supposed to be made possible by means of the method.

However, the method has the disadvantage that it is relatively complicated, because a further material is required and must be applied in a structured manner, in addition to the material composition that contains the powder, in order to produce the outer surface layer of the shaped object. Furthermore, a liquid hardener is used in the method, which bonds to the powder particles. The internal volume of the shaped object therefore consists of different materials, and thereby the mechanical strength of the shaped object is weakened.

The mechanical properties of the shaped object that is produced when using this method should also be mentioned. This is because the object is not homogeneous and composed of a strong material, but rather consists of a weak layer (UV-cross-linkable material) and a strong layer that contains the powder. In the case of large shapes, this should not be critical. As parts become smaller, the ratio of object to protective layer decreases, and thereby their properties, such as mechanical stability, also decrease.

Furthermore, the powder material is not a pure thermoplastic, but rather consists of a mixture, and therefore it is not as well able to withstand stress as a pure thermoplastic.

Furthermore, a method for producing a three-dimensional shaped object by means of layer-by-layer material application is known from U.S. Pat. No. 9,423,756 B2, in which method the individual material layers of the shaped object to be produced are applied to a base surface of a support roll and/or to a material layer situated on the base surface, using an electrophotographic printing apparatus. The printing apparatus has a photosensitive image roll, which can be rotated in a first and a second direction of rotation about its roll axis, by means of a motor. The image roll has a roll body that is coated with a photosensitive coating on its mantle surface, which coating is also referred to as an active layer hereinafter. The active layer consists of a material that is electrically insulating in the dark and electrically conductive under incident light.

To transfer an image to the active layer, the image roll interacts with a first and a second charge generation device to electrically charge the active layer, with an image converter, with a first and a second electrostatic and magnetic developing station, as well as with a first and a second cleaning device. The first developing station contains a first powder-form material that serves to produce a protective layer that is soluble in a solvent and is dissolved in the solvent after production of the shaped object. The second developing station contains a second material that contains powder particles, which material serves for producing a shaped object layer that is not soluble in the solvent.

The charge generation devices, the image converter, the developing stations, and the cleaning devices are positioned on the circumference of the image roll in such a manner that when the mantle surface of the active layer is moved, when the image roller is rotated in the first direction of rotation for coating the active layer with the first powder-form material, from the first charge generation device to the image converter, from there to the first developing station, and then to the second cleaning device. If the image roll is rotated in the opposite second direction of rotation, the mantle surface of the active layer moves from the second charge generation device to the image converter, from there to the second developing station, and then to the first cleaning device, so as to coat the active layer with the second material.

By means of the charge generation device, electrical charges are first generated on the active layer, over its full area and uniformly, in the dark. Afterward, the active layer is exposed to electromagnetic radiation, selectively and pixel by pixel, using the image converter, as a function of geometry data for the shaped object that is stored in a memory. At the exposed locations, the active layer becomes electrically conductive, and thereby the charges situated there are conducted away into the roll body, and thereby the active layer is electrically structured.

Behind the image converter in the direction of rotation of the image roll, the surface of the active layer is moved past the first or the second developing station in such a manner that the active layer is coated with the powder-form material of the corresponding developing station, in accordance with the charge distribution previously produced in its surface. The powder-form material is charged, in the developing station, to an electric potential that deviates from the electric potential of the active layer, in a triboelectric manner, in such a manner that the active layer is selectively coated with powder-form material, as a function of its corresponding potential.

After the photosensitive image roll has been selectively coated with the first and the second material, the coating applied to the active layer is transferred from the active layer to the mantle surface of a transfer roll, which is driven, by means of a further motor, synchronous to the image roll and opposite to the direction of rotation of the image roll. Here, too, the transfer of the powder-form first or second material takes place by means of a difference in charge between the material and the mantle surface of the transfer roll. If the synchronization of image roll and transfer roll is not undertaken with great precision, the absolute positioning is lost. In the case of a structure having thousands of layers, this results in a very irregular contour of the shaped object, and the optical homogeneity is worsened.

Finally, the powder-form material is transferred from the mantle surface of the transfer roll to the base surface or to an uppermost solidified material layer situated on it, and afterward is fixed in place by means of the effect of heat. The positioning accuracy of each of these layers is very critical, because the layer selectively produced precisely on the image roll is not applied directly above the preceding layer, but rather must first be transferred to a transfer roll and only then onto the existing layer. Synchronization of these mechanical components, which are exposed to expansions and temperature differences, is not precise enough. Furthermore they are subject to wear, which leads to worse precision, over time, of the layers that are laid one on top of the other.

The steps mentioned above are repeated until all the material layers of the shaped object have been layered one on top of the other. Afterward, the layer arrangement obtained in this manner is dissolved in the solvent, so as to remove the first material, which serves as a support material.

For carrying out the previously known method, the following components are required:

An expensive photosensitive image roll, which is subject to wear and therefore has a short useful lifetime, an expensive image converter, generally a laser scanner, or LED scanner, complicated charge generation devices, which are subject to wear and therefore have a short useful lifetime, each having charge/discharge coronas for electrically charging the active layer, expensive developer units, which are subject to wear and therefore have a short useful lifetime.

All of these components are consumables, which have a relatively short useful lifetime and must be replaced frequently. In particular, the image roll is subject to wear of its photosensitive layer. The composition of the powder-form materials is also very complex, because they must contain many components so as to make them controllable in terms of their charge, such as the construction material for the shaped object, additives for improving flowability, and additives for improving the electric chargeability of the second material. The magnetic carrier particles must be adapted precisely to the type of toner, and the production of a well-functioning toner plus carrier particles is complicated.

Furthermore, the known method has the disadvantage that in the case of shaped objects in which a large number of material layers are printed one on top of the other, the dimensional stability of the printed shaped object can only be maintained with difficulty, because layer thickness tolerances of the material layer can occur.

SUMMARY OF THE INVENTION

It is therefore the task of the invention to create a method of the type stated initially, which allows dimensionally accurate and very precise production of a shaped object that has great mechanical stability and strength, in a simple and cost-advantageous manner, by means of layer-by-layer material application. In particular, the method is also supposed to make possible great surface precision of the shaped object and a shaped object that is stable in the long term.

This task is accomplished with the characteristics as described herein. These characteristics provide, in the case of a method for producing a three-dimensional shaped object by means of layer-by-layer material application, that geometry data for the shaped object, a support part having a base surface for holding the three-dimensional shaped object, a liquid or flowable first material, which can solidify, a powder-form, thermoplastic second material comprising powder particles, and a solvent in which the solidified first material is soluble are made available, a) that for the formation of a negative mold layer, material portions of the flowable, liquid or powder-form first material are applied, in accordance with the geometry data, to the base surface and/or to a solidified material layer situated on it, in such a manner that the negative mold layer has at least one cavity on its surface that faces away from the base surface, which cavity has a negative mold of a shaped object layer to be produced, b) that the negative mold layer is solidified, c) that at least the bottom of the cavity, formed by the base surface or by a solidified material layer situated on it, is charged to an electric potential having a first polarity, d) that powder particles of the second material are charged to an electric potential having a second polarity opposite to the first polarity and applied to a support surface of a particle support, over its full area, e) that the support surface, with the powder particles situated on it, is positioned facing the at least one cavity and relative to the cavity, in such a manner that the powder particles are transferred from the support surface into the cavity, and in it form a shaped object layer having a positive shape that matches the negative mold, f) that the shaped object layer obtained in this manner is sintered and solidified by means of the effect of heat, g) that regions of the solidified negative mold layer and/or of the solidified shaped object layer projecting beyond a plane arranged at a predetermined distance from the base surface are removed by means of material removal, in such a manner that a planar surface is produced, which extends over the negative mold layer and the shaped object layer, h) that steps a) to g) are repeated at least once, and i) that afterward, the negative mold layers are brought into contact with the solvent, in such a manner that the solidified first material dissolves in the solvent.

According to the invention, a hybrid method is therefore provided, in which materials having different properties are processed by means of different printing methods and applied to the base surface or to a solidified material layer of the three-dimensional shaped object situated on it, layer by layer.

What should be particularly emphasized is the precision in building up the layers of the first and also of the second material. Thus, not only is the negative mold positioned by inkjet, but also the powder is positioned by way of a coating roll, without an intermediate support. This allows one-hundred-percent control of the shapes in every direction.

The first material can have very low viscosity, i.e., it can be inviscid or highly flowable, because it only serves for producing a negative mold for the second material. Due to the low viscosity or the great flowability that the first material has during application to the base surface or to an already solidified material layer situated on it, the mold can be printed by means of a digital printing method, with high resolution and surface quality, in that a great number of accordingly small material portions of the first material is applied to the base surface or to the solidified material layer of the three-dimensional shaped object situated on it.

Only low demands are made with regard to the mechanical stability and strength of the material layer of the negative mold that consists of the first material, since the negative mold only needs to carry the second material and to withstand forces possibly exerted on the first material during the printing process provided for applying the second material. By means of the solidification of the first material, this material achieves a sufficient strength so that it can serve as the shaper for the second material. The mechanical strength of the first material, when it is in its solidified state, has no influence on the mechanical stability of the shaped object formed from the solidified layers of the second material, because the solidified first material is removed from the shaped object after application of all the material layers, by means of being dissolved in the solvent. The solidified second material is insoluble in the solvent.

The powder-form second material is the actual construction material for the shaped object, and can have different properties, above all greater strength in the solidified state, than the first material. Thermoplastic powder particles are understood to be powder-form particles that can be liquefied by means of the application of energy.

Since the second material is geometrically shaped by means of being molded in the previously solidified negative mold that was precisely produced from the first material, the powder-form second material can be applied to the support surface of the particle support in a simple manner, over its full area, i.e. not selectively. Afterward, the particle support is positioned on the cavity of the negative mold layer in such a manner that the powder-form second material is transferred from the support surface into the cavity, and fills the latter over its full area and completely. Since the second material is applied to the particle support over its full area, i.e., not selectively, no structured regions of the second material that are situated on the support surface need to be positioned relative to the cavity during positioning of the particle support on the cavity. This allows the method to be carried out in a simple manner. During molding of the solidified negative mold, at least one delimitation surface of the negative mold, arranged transverse to the planes in which the material layers of the shaped object extend, will be molded onto the second material, i.e., transferred to it.

The bottom of the cavity, formed by the base surface or the solidified material layer situated on it, can be charged by means of a charging corona and/or a charging plate, to the electric or electrostatic potential having the first polarity. The charging plate is preferably arranged directly below the base surface, parallel to it, wherein an insulation layer is provided between the base surface and the charging plate.

Because the individual shaped object layers are sintered after being applied, in each instance, to the base surface or to a solidified material layer situated on it, by means of the effect of heat, the molded body can be produced from a uniform material. During sintering, the powder particles contained in the powder-form second material melt into one another, and thereby a one-piece shaped object is formed. By means of the sintering, the at least one delimitation surface of the solidified negative mold, arranged transverse to the planes in which the material layers of the shaped object extend, is very precisely molded to form the shaped object layer. As a result, it is actually possible to produce three-dimensional shaped bodies having a smooth, mechanically stable surface, or bodies having a texture. Due to the solidification of the second material by means of sintering, a shaped object having long-term stability is furthermore made possible. Partially crystalline and preferably amorphous thermoplastic powder particles are preferably used as thermoplastic powder particles. The amorphous powder particles generally have a lesser shrinkage behavior during sintering than crystalline powder particles. Amorphous powder particles can be processed at room temperature in the interior of a printer, i.e., the second material or the construction material does not have to be brought to a temperature that lies just below the melting point.

During sintering, the second material is preferably irradiated with a heat radiation that is preferably generated using at least one flash lamp. Other energy providers that can deliver the energy very quickly can also be used. When using the flash lamp, the second material is rapidly heated to the temperature required for sintering. After the flash is extinguished, the material rapidly cools again. In this way, a sufficiently great introduction of energy into the uppermost material layer and the material layer that lies underneath it is guaranteed, without the shaped object or the base surface being heated unnecessarily, but the two last layers thermally bond to one another.

The first and the second material are preferably selected in such a manner that the second material absorbs the heat radiation generated during the heat treatment more strongly than the first material. This can be achieved in that the second material consists of a material that is more absorbent, for example a darker material than the first material. In particular, the second material can be black and the first material can be white or transparent. As a result, the thermal stress on the first material is reduced during the heat treatment of the second material.

In the case of the method according to the invention, because preferably after printing of each individual material layer, regions of the solidified negative mold layer and/or of the solidified shaped object layer, in each instance, which regions project beyond a plane arranged at a predetermined distance from the base surface, preferably parallel to it, are removed by means of material removal, so as to produce a planar surface, the individual layers of the shaped object run precisely parallel or are arranged in a predetermined arrangement relative to one another, and have a predetermined layer thickness. Furthermore, "contaminants" that can occur during filling of the cavities with the second material, on the surface of the uppermost solidified layer of the first material, if the second material comes into contact with this surface, are removed by means of the material removal. Removal of the regions that project beyond the plane therefore ensures that the mixed layer consisting of the solidified first and second material always has the desired thickness, and is free of second material that cannot dissolve in the solvent at the surface of the first material. This allows very precise and low-distortion production of the shaped object, even if the shaped object has several thousand material layers.

In a preferred embodiment of the invention, the material portions of the first material are applied to the base surface and/or to the solidified negative mold layer situated on it and/or to a solidified shaped object layer by means of a material application printing process, preferably an inkjet printing process, wherein the first material is a material that can be solidified by means of the effect of energy, to which energy is applied for solidifying the negative mold layer. In this regard, the energy can be an electromagnetic radiation, in particular ultraviolet radiation, by means of which a polymer and/or copolymer contained in the first material is solidified by means of cross-linking. In this case, the first material preferably contains a photoinitiator. However, it is also possible to solidify the first material by means of irradiation with an electron beam. Furthermore, the first material can also be selectively applied to the base surface and/or to a solidified material layer situated on it by means of an electrophotography method.

In a practical embodiment of the invention, the first material has a working viscosity that is suitable for inkjet printing, which is less than 1000 mPa·s, in particular less than 100 mPa·s, possibly less than 30 mPa·s, and preferably less than 20 mPa·s, and is applied to the base surface and/or to the solidified material layer of the three-dimensional shaped object situated on it in the form of liquid droplets having a resolution of at least 180 dpi, in particular at least 360 dpi, and preferably at least 720 dpi or 1440 dpi. This allows a high surface quality of the negative mold and thereby of the shaped object.

It has proven to be advantageous if the regions of the solidified negative mold layer and/or of the solidified shaped object layer that project beyond the plane are removed by means of chip-removing or particle-removing material removal, in particular by means of milling, grinding, laser treatment, and cleaning and/or polishing. This allows rapid progress of the work, in each instance, during leveling of the individual material layers, and allows the production of a precisely planar material layer surface, arranged parallel to the base surface.

In a preferred embodiment of the invention, the powder particles are triboelectrically charged. For this purpose, the powder particles are brought into contact with a material (carrier) that has a greater holding force than the powder particles, and afterward the powder particles are separated from the material by means of a difference in potential. Preferably the powder particles are rubbed onto the material by being mixed in a container, so that the powder particles are charged triboelectrically.

It is practical if the particle support has an electrically conductive layer having an insulation layer situated on it, wherein an electric potential having the first polarity is applied to the electrically conductive layer, in such a manner that particles situated on the support surface are electrostatically drawn to it, through the insulation layer. The insulation layer preferably consists of a ceramic or another abrasion-resistant material. The insulation layer makes a long useful lifetime possible, along with low wear of the particle support during printing. The surface of the particle support can consist of a material that is not photosensitive, i.e., the electric properties of the surface are independent of whether it is situated in the dark or exposed to irradiation with electromagnetic radiation, such as light. This makes it possible to carry out the method in a simple manner.

In another embodiment of the invention, the particle support has an electrically conductive layer having an active layer situated on it, the electric conductivity of which can be changed by means of being exposed to optical radiation, wherein the active layer is selectively structured by means of an electrophotography process, using an electric potential, wherein the active layer is afterward brought into contact with the powder particles of the second material, in such a manner that these adhere to the active layer as a function of the structuring of the active layer with the electric potential, and wherein the active layer, structured with the powder particles in this manner, is positioned on the cavity so as to transfer the powder particles into the cavity. The surface of the particle support can therefore also be coated with the powder particles in an electrophotographically structured manner. In this way, the amount of the residual powder particles remaining on the particle support after the cavity of the negative layer has been filled can be reduced.

Preferably the powder particles are charged using a triboelectric charging device that has a reservoir filled with the powder particles and a stirring unit that stands in contact with the powder particles, which unit is configured in such a manner and moved relative to the powder particles so that these are electrically charged. The powder particles can thereby be charged in a simple manner.

In a practical embodiment of the invention, a coating roll is used as the particle support, the mantle surface of which roll serves as a support surface for the powder particles, wherein the mantle surface is brought into contact, at a first location, with the powder particles having the potential of the second polarity, and the coating roll is rotated about the roll axis of the coating roll, relative to the first location, for full-area coating of the mantle surface with the powder particles, and wherein the mantle surface is turned to face the cavity, at a second location coated with the powder particles, which location is offset from the first location in the circumference direction of the mantle surface, and positioned relatively close to the cavity, in such a manner that the powder particles are transferred from the mantle surface into the cavity to form the shaped object layer. Using such a coating roll, the powder-form material situated on the surface of the coating roll can be applied directly, continuously, and with great precision, to the base surface or to a solidified material layer situated on it. Due to the absence of intermediate supports, the greatest precision in positioning that is possible can be achieved.

It is advantageous if powder particles that adhere to a section of the mantle surface of the coating roll, which section lies behind the second location and ahead of the first location in the direction of rotation, are removed from the mantle surface and transported back into the reservoir. The mantle surface of the coating roll is therefore cleaned after it has moved past the second location, i.e., after it has been moved past the cavity, before it is once again positioned at the first location. By means of this cleaning of the mantle surface, an accumulation of charge separation materials contained in the powder particles and/or applied to them as a coating, on the mantle surface, is counteracted.

In an embodiment of the invention, a cylindrical roll is used as the coating roll, wherein the support part that has the base surface i) is displaced, for application of a first material layer, proceeding from a starting position, in a forward transport direction relative to the coating roll, ii) afterward, it is moved back, relative to the coating roll, into the starting position, iii) then, for application of a second material layer, it is displaced once again, relative to the coating roll, in the forward transport direction, and wherein the support part is lowered during and/or between Steps i) to iii), relative to the coating roll. The base surface is therefore moved back and forth during the layer-by-layer production of the shaped object, relative to the cylinder axis of the cylindrical mantle surface of the coating roll, for example between two end positions. This embodiment of the method is preferably used if the geometry data for the shaped object are present in a Cartesian coordinate system.

In a further development of the invention, the support part that has the base surface is rotated relative to the coating roll during the material application and, if necessary, during solidification of the materials, about an axis of rotation that is arranged transverse to the cylinder axis of the coating roll, and, if necessary, lowered relative to the coating roll during the rotational movement, wherein the coating roll is structured as a conical roll, the roll cross-section of which decreases, proceeding from its end farthest away from the axis of rotation to its other end, which is arranged closer to the axis of rotation. This embodiment has the advantage that the base surface can be continuously rotated about the axis of rotation during the entire production process of the shaped object, and this allows interruption-free printing. In comparison with a method in which the base surface is moved back and forth between two end positions during printing, faster progress of printing and less wear on the 3D printer used for carrying out the method are made possible by means of the rotational movement of the base surface.

In the case of the method known from U.S. Pat. No. 9,423,756 B2, in which the coating roll is structured as an image roll having a photosensitive layer, a conical structure of the image roll would not be practical, because problems would occur with electrical charging of the mantle surface. The roll circumference must have a constant diameter along the corona, so as to achieve a homogeneous potential on the mantle surface of the image roll. Furthermore the formation of the developer unit would also become more complicated, because the circumferential speeds of a commercially available developer unit would be different at the beginning and the end of the magnetic roll. Discharge of the photo layer of the image roll by means of a laser/LED beam would also take place with different energy at the ends of the roll, and this would mean a toner layer having a different thickness at these locations.

Therefore the method known from U.S. Pat. No. 9,423,756 B2 can only be used in a Cartesian coordinate system.

In an advantageous embodiment of the invention, a feed roll for the powder particles is made available, which roll is at a distance from the mantle surface of the coating roll with its mantle surface, forming a roll gap in which the carrier, with the powder particles adhering to it, touches the mantle surface of the coating roll, wherein the feed roll has an electrically conductive feed roll layer on its mantle surface, with an insulation layer situated on it, wherein an electric potential having the second polarity is applied to the feed roll layer, in such a manner that particles situated on the mantle surface of the feed roll are electrostatically attracted to this layer, wherein the mantle surface of the feed roll is brought into contact with the powder particles at a location that is at a distance from the roll gap, and the feed roll is rotated about its axis, in such a manner that powder particles situated on the mantle surface of the feed roll get onto the mantle surface of the coating roll, and wherein the potential applied to the feed roll layer and the potential applied to the electrically conductive layer of the coating roll are selected in such a manner that the powder particles are transferred in the roll gap, from the mantle surface of the feed roll to the mantle surface of the coating roll. In this way, the powder-form second material can be transferred to the mantle surface of the coating roll with a defined thickness.

In a preferred embodiment of the invention, it is provided that magnetically conductive and preferably triboelectrically chargeable carrier particles are made available and brought into contact with the powder particles of the second material, in such a manner that the powder particles remain releasably adhering to the carrier particles, that a magnetic feed roll for the powder particles is made available, which is spaced apart from the mantle surface of the coating roll by a roll gap with its mantle surface, that the magnetic carrier particles, with the powder particles adhering to them, are brought into contact with the mantle surface of the feed roll at a location at a distance from the roll gap, in such a manner that the carrier particles remain adhering to the mantle surface of the feed roll magnetically, that the feed roll is rotated about its axis in such a manner that carrier particles situated on the mantle surface of the feed roll, with the powder particles adhering to them, are first moved past a stripping device, to strip off carrier particles coated with powder particles and, after having passed through the stripping device, get into the roll gap, and that the potential of the coating roll is selected in such a manner, in deviation from the potential of the powder particles adhering to the carrier particles, that the powder particles are released from the carrier particles in the roll gap and transferred to the mantle surface of the coating roll. In this regard, the magnetically conductive carrier particles, in combination with the magnetic feed roll, allow uniform application of the powder-form second material to the coating roll, with a defined layer thickness. After the powder particles have been released from the carrier particles in the roll gap, the carrier particles can be coated with powder particles once again and then re-used. The powder particles preferably adhere to the carrier particles by way of electrostatic forces.

In another preferred embodiment of the method, magnetically conductive carrier particles are made available and brought into contact with the powder particles of the second material, in such a manner that the powder particles remain releasably adhering to the carrier particles, that a coating roll having a magnetic mantle surface is made available, which is spaced apart, by a transfer gap, from the bottom of the cavity to be filled with the powder particles, that the magnetic carrier particles, with the powder particles adhering to them, are brought into contact with the mantle surface of the coating roll at a location that is at a distance from the cavity, in such a manner that the carrier particles remain adhering to the mantle surface of the coating roll magnetically, that the coating roll is rotated about its axis in such a manner that carrier particles situated on the mantle surface of the coating roll, with the powder particles adhering to them, are first moved past a stripping device, to strip off carrier particles coated with powder particles, and after having passed through the stripping device, get into the transfer gap, and that the potential of the bottom of the cavity is selected in such a manner, in deviation from the potential of the powder particles adhering to the carrier particles, that the powder particles are released from the carrier particles in the transfer gap and transferred to the bottom of the cavity. The powder particles can therefore also be transferred directly from the magnetic roll of the developer into the cavity of the negative mold. In this way, an additional coating roll and the return of the powder particles to the powder particle reservoir are eliminated, so that the method can be carried out in a simple manner.

In a further development of the invention, an electrically conductive material is used as the first material, and an electrically insulating material is used as the second material, wherein at least the solidified negative mold layer arranged closest to the support surface of the particle support is brought to an electric potential that differs from the potential of the electrically conductive region of the particle support and from the electric potential of the powder particles of the second material situated on the particle support, in such a manner that during positioning of this negative mold layer on the support surface of the particle support, fewer, in particular 50% fewer, possibly 70% fewer and preferably 90% fewer powder particles per surface unit are transferred to the negative mold layer than per surface unit in at least one cavity of this negative mold layer when the cavity is positioned on the support surface of the particle support. The potentials of the electrically conductive region of the particle support, of the negative mold layer, and of the powder particles are therefore selected to be different, in such a manner that the powder-form second material is transferred from the support surface of the particle support essentially only into the cavity, but not onto the surface of the uppermost negative mold layer. The material given off by the support surface of the particle support that is not coated with the powder particles, over its full area, or by the coating roll onto the negative mold layer, can then be used, if applicable, for coating further shaped object layers. In this way, the amount of the second material required for the production of the shaped body is reduced accordingly.

In a further development of the invention, the powder-form second material comprises a photoinitiator, wherein the thermoplastic powder particles have a polymer and/or a copolymer, and wherein the photoinitiator is activated, after sintering, by means of irradiation with electromagnetic radiation, to cross-link the polymer. In an advantageous manner, a duroplastic can be produced from thermoplastic particles, using this method. As a result, the temperature resistance of the second material is increased. In the case of pure thermoplastics, in contrast, the temperature resistance is problematic.

In a particularly advantageous embodiment of the invention, the support part has at least two electrodes on the base surface, laterally offset from one another in a top view of the base surface, preferably engaging into one another in comb-like manner, wherein an electric voltage is applied to the electrodes, in such a manner that the electrode potential having the first polarity occurs at the bottom of the cavity.

In this way, the powder particles of the second material can be released particularly well from the particle support at the cavity and fixed in place on the bottom of the cavity.

It is advantageous if the electric voltage applied to the electrodes is increased at least once, in terms of amount, between application of the first and application of the last negative mold layer. In this way, the decrease in the amount of the electrostatic potential that is present at the bottom of the cavities of the negative mold layers with an increasing number of material layers applied to the base surface can be counteracted.

In a preferred embodiment of the invention, a measurement signal for the electric potential is detected at the level of the bottom of the cavity and compared with a reference value or a reference value range, wherein if a deviation occurs between the measurement signal and the reference value or the reference value range, the electric voltage at the electrodes is changed in the sense of a reduction in the deviation. In this way, the electric potential at the bottom of the cavity can be kept constant, to a great extent, over the entire printing process.

BRIEF DESCRIPTION OF THE DRAWINGS

In the following, exemplary embodiments of the invention are explained in greater detail. The drawing shows.

DESCRIPTION OF THE INVENTION

In the case of a method for producing a three-dimensional shaped object 1 by means of layer-by-layer material application, geometry data for the shaped object 1 are made available by a control unit that communicates with a computer on which software is running. Furthermore a plate-shaped, electrically conductive support part 2 having a base surface 3 arranged in a horizontal plane is made available for holding the shaped object 1.

Figure 1:
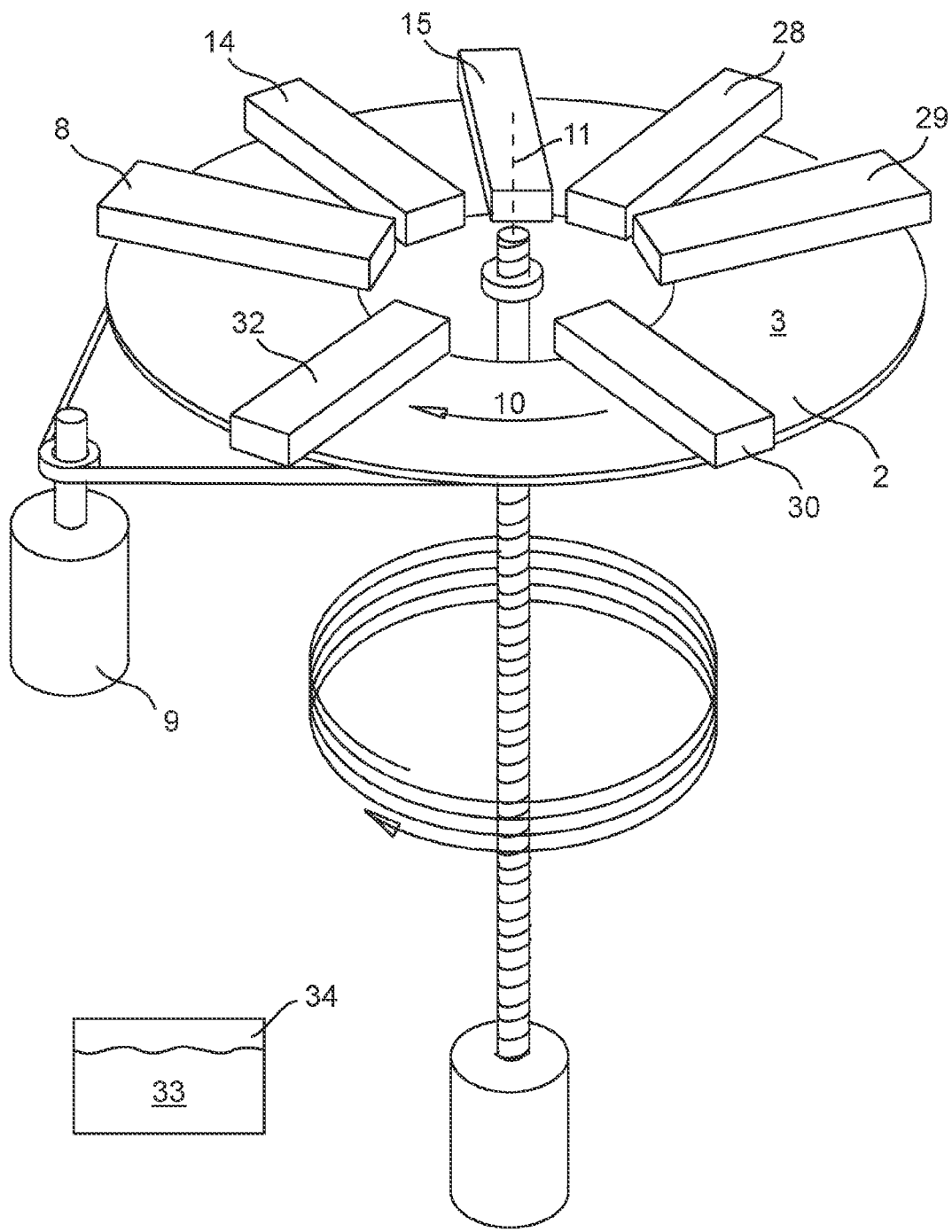
FIG. 1 a schematic representation of an apparatus in a polar embodiment, for producing a three-dimensional shaped object by means of layer-by-layer material application, wherein the apparatus has a first dispensing device for dispensing a liquid material, and a second dispensing device for dispensing a powder-form material, FIG. 2A to 2F a cross-section through a shaped object produced layer by layer, during different method steps of its production, FIG. 3 a partial view of the apparatus shown in FIG. 1, wherein a cover arranged above the second dispensing device was removed, FIG. 4 a conical coating roll, FIG. 5 a side view of a first exemplary embodiment of the second dispensing device during application of a layer of the powder-form material to a solidified material layer, FIG. 6 a side view of a chip-removing and/or particle-removing leveling unit during planar milling, grinding or polishing of a material layer, FIG. 7 a three-dimensional view of a layer stack, consisting of the material layers of the first and second material, FIG. 8 a three-dimensional view of the shaped object after removal of the material layers of the first material using a solvent, FIG. 9 a cross-section through a further shaped object after application of all the material layers, FIG. 10 a cross-section through the shaped object shown in FIG. 9, after removal of the material layers of the first material, FIG. 11 a side view of a second exemplary embodiment of the second dispensing device during application of a layer of the powder-form material to a solidified material layer, FIG. 12 a side view of an apparatus in a Cartesian embodiment, during production of a three-dimensional shaped object, FIG. 13 a cylindrical coating roll, FIG. 14 a top view of the second dispensing device of the apparatus of FIG. 12, FIG. 15 a side view of a further apparatus in a Cartesian embodiment during production of a three-dimensional shaped object, FIG. 16 a representation similar to FIG. 15, wherein, however, the powder-form material is applied to a material layer of the shaped object, in each instance, only in the region of a cavity.

A first exemplary embodiment of the method is carried out using the apparatus shown in FIG. 1, in which the base surface 3 essentially has the shape of a circular ring disk. However, other embodiments are also conceivable, in which the base surface 3 can be configured, in particular, in the shape of a solid circular disk or a rectangle.

In the case of the first exemplary embodiment, a liquid first material 4 that can be solidified, a powder-form second material 5 that can be solidified and comprises thermoplastic powder particles, and water as a solvent for the solidified first material 4 are made available. The solidified second material 5 is not soluble in the solvent. The second material 5 has a greater strength, in the solidified state, than the solidified first material 4, due to the solid particles contained in it. The first material 4 is a polymer that contains a photoinitiator and can be cross-linked by means of irradiation with ultraviolet radiation.

The liquid first material 4 is arranged in a first reservoir 6, and the powder-form second material 5 is arranged in a second reservoir 7. The first reservoir 6 is connected with a first dispensing device 8 for the first material 4, by way of a line. The first reservoir 6 is configured as an essentially closed container, and the second reservoir 7 is configured as a basin.

The first dispensing device 8 has a first inkjet print head having a plurality of jets arranged in a row, not shown in any detail in the drawing, which are directed at the base surface 3 or at a solidified material layer of the first and/or second material 4, 5 situated on it, to dispense material portions of the first material 4. The row of jets is arranged parallel to the plane of the base surface 3, and extends transverse to the circumference direction of the base surface 3, preferably essentially radially relative to its center.

The support part 2 and the first dispensing device 8 can be rotated relative to one another in the direction of the arrow 10, using a positioning device 9, and can be displaced parallel to the axis of rotation 11. During this process, points that lie in the base surface 3 and are at a distance from the axis of rotation 11 move along a path curve that is shaped as a spiral line or screw line.

Figure 2D:
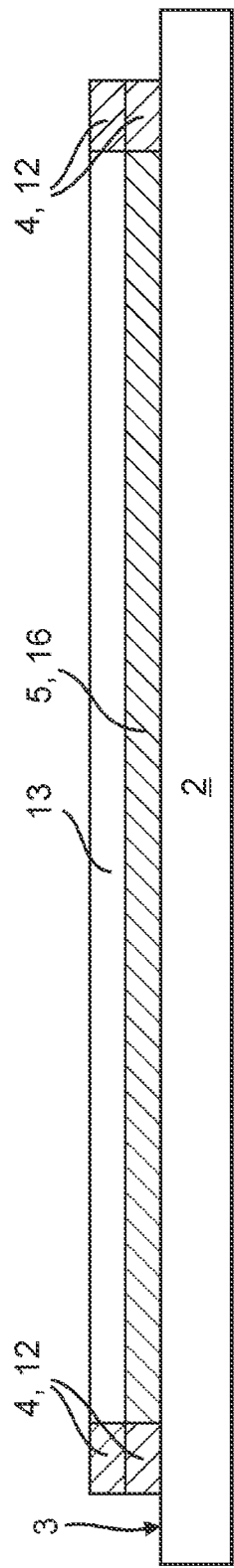

The first dispensing device 8 and the first positioning device 9 are connected with a control device, not shown in any detail in the drawing, which has a data memory for storing the geometry data of the shaped object 1 to be produced. By means of the control device, both the process of dispensing the material portions of the first material 4 and the first positioning device 9 can be controlled as a function of the geometry data, in such a manner that negative mold layers 12 consisting of the flowable first material 4 can be applied to the base surface or to a solidified material layer of the first and/or second material 4, 5 previously applied to it (FIG. 2A). In this regard, the negative mold layers 12 have at least one cavity 13, in each instance, which has a negative mold of a material layer of the shaped object 1 to be produced. The cavities 13 extend, in each instance, over the entire layer thickness of the negative mold layer 12 in question, all the way to the base surface 3 or to the solidified material layer situated under the negative mold layer 12.

A solidification device 14 is arranged behind the first dispensing device 8 in the direction of the arrow 10, by means of which device the liquid first material 4 applied to the base surface 3 or to a solidified material layer situated on it is solidified. For this purpose, the solidification device 14 has a first UV-radiation source, not shown in any detail in the drawing, by means of which device ultraviolet radiation can be given off onto the material layer of the first material to be solidified, in such a manner that a photo-cross-linking agent contained in the first material is activated, and the polymers contained in the first material 4 are cross-linked.

A second dispensing device 15 is arranged behind the solidification device 14 in the direction of the arrow 10, by means of which device the cavity/cavities 13 of the corresponding previously solidified negative mold layer 12 are filled with the second material 5, so as to form a shaped-object layer 16 (FIG. 2B).

The second dispensing device 15 has a corona charging device 17, which is arranged behind the solidification device 14 in the direction of the arrow 10 and has multiple corona wires 18. A negative electric potential is applied to the corona wires 18, which potential differs from the potential of a section of the base surface 3 positioned on the first dispensing device 8, and serves for electrically charging the bottom of the cavity 13 and, if applicable, the material layer of the first material 4 on its surface that faces the corona wires 18. By means of the electric potential applied to the corona wires 18, the air situated in the space between the corona wires 18 and the surface region of the base surface 3 that lies opposite it is ionized. When a material layer of the first material 4 on the base surface 3 and/or on a solidified material layer situated on it is moved past under the corona wires 18, in the direction of the arrow 10, the bottom of the cavity 13 and, if applicable, the surface of the material layer that consists of the first material 4, which faces the corona wires 18, is electrically charged to a positive first potential. The difference in potential between the corona wires 18 and the potential of the support part 2 can amount to 5 KV, for example.

As can be seen in FIG. 3, the second dispensing device 15 has a triboelectric charging device 19, which is actually known and shown only schematically in the drawing, a conical feed roll 20A that interacts with the former, and a conical coating roll 21A.

The feed roll 20A and the coating roll 21A are each configured as a truncated cone and arranged in such a manner that the imaginary cone tip assigned to its mantle surface lies on the axis of rotation 11 of the support part 2. The feed roll 20A and the coating roll 21A are each arranged so as to rotate about their longitudinal center axis. In FIG. 3, it can be seen that the feed roll 20A and the coating roll 21A each have axle stumps at their axial ends, at which they are mounted, so as to rotate, on locally fixed mountings, which are not shown in any detail in the drawing. The axes of rotation 22, 23 about which the feed roll 20A and the coating roll 21A are each mounted so as to rotate are arranged in such a manner that a roll gap 24 is formed between the mantle surface of the feed roll 20A and the mantle surface of the coating roll 21A, which gap has a constant gap width in a plane spanned between the axes of rotation 22, 23.

The feed roll 20A has an electrically conductive feed roll layer formed by its roll core, on which layer an electric insulation layer is arranged, which forms the mantle surface of the feed roll 20A. In a corresponding manner, the coating roll 21A has an electrically conductive layer 43, formed by its roll core, which is coated with an electric insulation layer 44 on its mantle surface.

Figure 5:
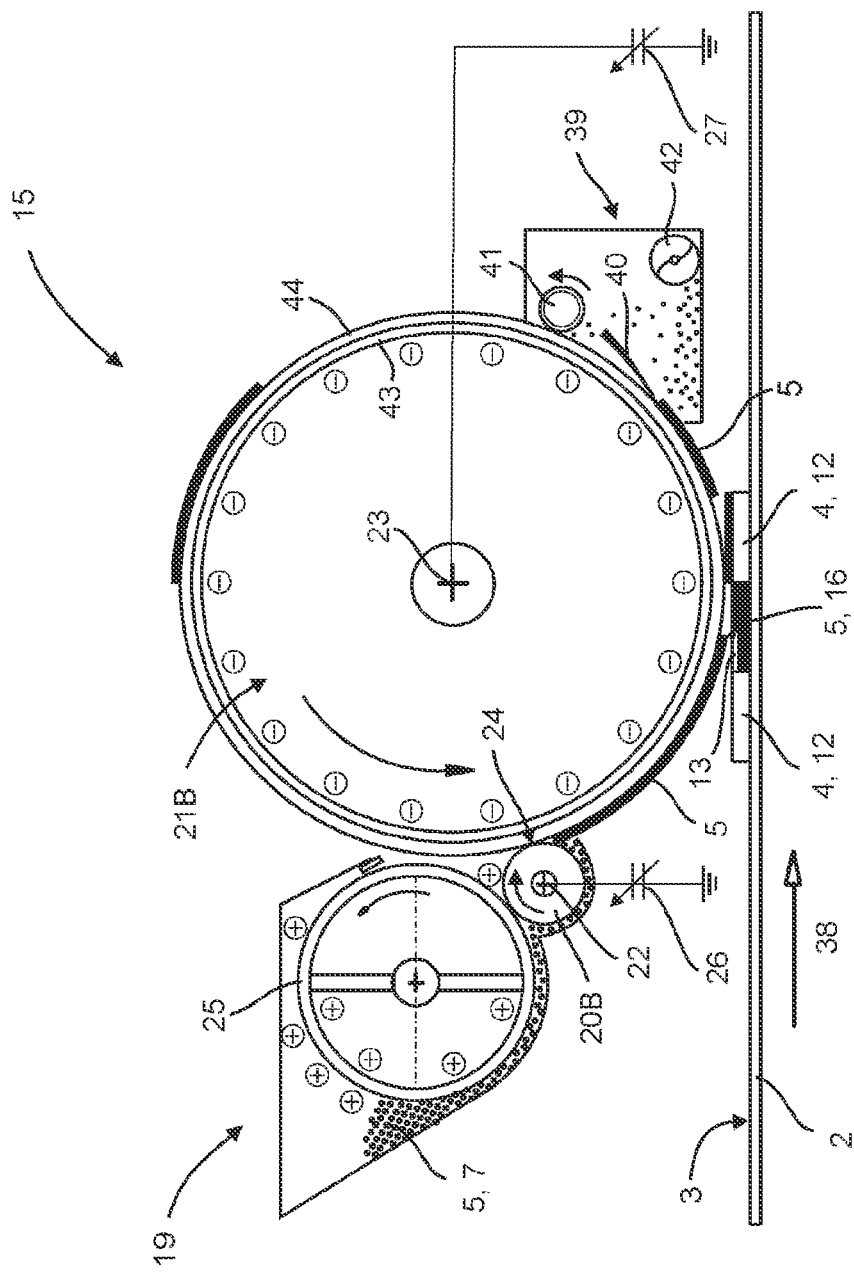

In the exemplary embodiment shown in FIG. 3, the triboelectric charging device 19 has a stirring unit 25 that is arranged in the second reservoir 7 and driven so as to rotate, by means of which unit the powder particles of the second material 5 that are contained in the second reservoir 7 are swirled up in such a manner that they intensively rub against one another, against the stirring unit 25, and against the walls of the second reservoir 7. During this process, the powder particles are triboelectrically charged to a positive second potential. The triboelectric charging device 19 of the apparatus shown in FIG. 3 corresponds to the triboelectric charging device 19 of the apparatus according to FIG. 5.

In the second reservoir 7, the electrically charged powder particles come into contact with the mantle surface of the feed roll 20A at a contact location that is at a distance from the roll gap 24. The electrically conductive roll core of the feed roll 20A has a negative third potential applied to it, which deviates from the second potential and is selected in such a manner that the powder particles are electrostatically attracted to the mantle surface of the feed roll 20A. The third electric potential can be adjusted using a first setting element 26.

The feed roll 20A is rotated about its axis of rotation 22, which lies on the roll axis, in such a manner that powder particles situated on the mantle surface of the feed roll 20A get into the roll gap 24. On their way to the roll gap 24, the powder particles are moved through a gap having a defined gap width. In this way, the material thickness with which the mantle surface of the feed roll 20A is coated with the second material 5 is established. Excess material particles are stripped off the feed roll 20A at the gap.

A fourth potential is applied to the electrically conductive layer 43 of the coating roll 21A, which potential is adapted to the third potential in such a manner that the powder particles are released from the mantle surface of the feed roll 20A in the roll gap 24 and non-selectively transferred to the mantle surface of the coating roll 21A over the entire length of the roll gap 24. In this way, the mantle surface of the coating roll 21A is non-selectively coated with the powder particles, i.e., in an interruption-free manner. The fourth electric potential can be adjusted using a second setting element 27, preferably between a negative and a positive potential value, in particular from −1000 V to +1000 V.

By means of the rotational movement of the coating roll 21A about its axis of rotation 23 and the rotational movement of the base surface 3 about the axis of rotation 11, the powder particles situated on the mantle surface of the coating roll 21A get to a material dispensing location that is offset from the roll gap 24 in the circumference direction of the mantle surface, and faces the cavity 13 in the material layer of the first material 4. During this process, the powder particles are positioned closely relative to the cavity 13, in such a manner that they come loose from the mantle surface of the coating roll 21A due to a force brought about by means of the difference in potential between the fourth and the first potential, and are transferred into the cavity 13 to form the shaped-object layer 16. During this process, the cavity 13 is completely filled with the second material 5.

Powder particles that are not released from the mantle surface of the coating roll 21A at the material dispensing location are removed from the mantle surface of the coating roll 21A by means of a cleaning device 39. The cleaning device 39 has a scraper 40 that engages on the mantle surface of the coating roll 21A, and a cleaning roll 41, which is driven to rotate about an axis arranged parallel to the axis of rotation of the coating roll 21A, counter to the direction of rotation of the coating roll 21A. The scraper 40 and the cleaning roll 41 are arranged behind the material dispensing location and ahead of the feed roll 20A in the direction of rotation of the coating roll 21A. To remove material particles, the cleaning roll 41 makes contact, at its outer circumference, with the mantle surface of the coating roll 21A. The scraper 40 and the cleaning roll 41 are arranged in a collection container into which the material particles removed from the mantle surface of the coating roll 21A are discharged. At the bottom of the collection container, there is a conveying screw 42, by means of which the powder particles can be transported back into the second reservoir 7 by the cleaning device 39, so as to feed them to renewed use (FIGS. 5, 11, 12, 17 and 19).

A heat treatment station 28 is arranged behind the material dispensing location at which the cavity 13 was filled with the second material 5, in the direction of the arrow 10, which station can comprise, for example, an infrared heater and/or a flash lamp. As it passes by the heat treatment station 28, the second material 5 that was previously filled into the cavity 13 is thermally sintered, wherein the powder particles contained in it melt together with one another and, if applicable, with a layer composed of the second material 5 that is situated underneath.

If necessary, a cross-linking device 29 can be arranged behind the heat treatment station 28 in the direction of the arrow 10, at which device a polymer and/or copolymer contained in the second material 5 is cross-linked by means of irradiation with ultraviolet radiation and/or by means of irradiation with an electron beam, to form a duroplastic.

Figure 6:
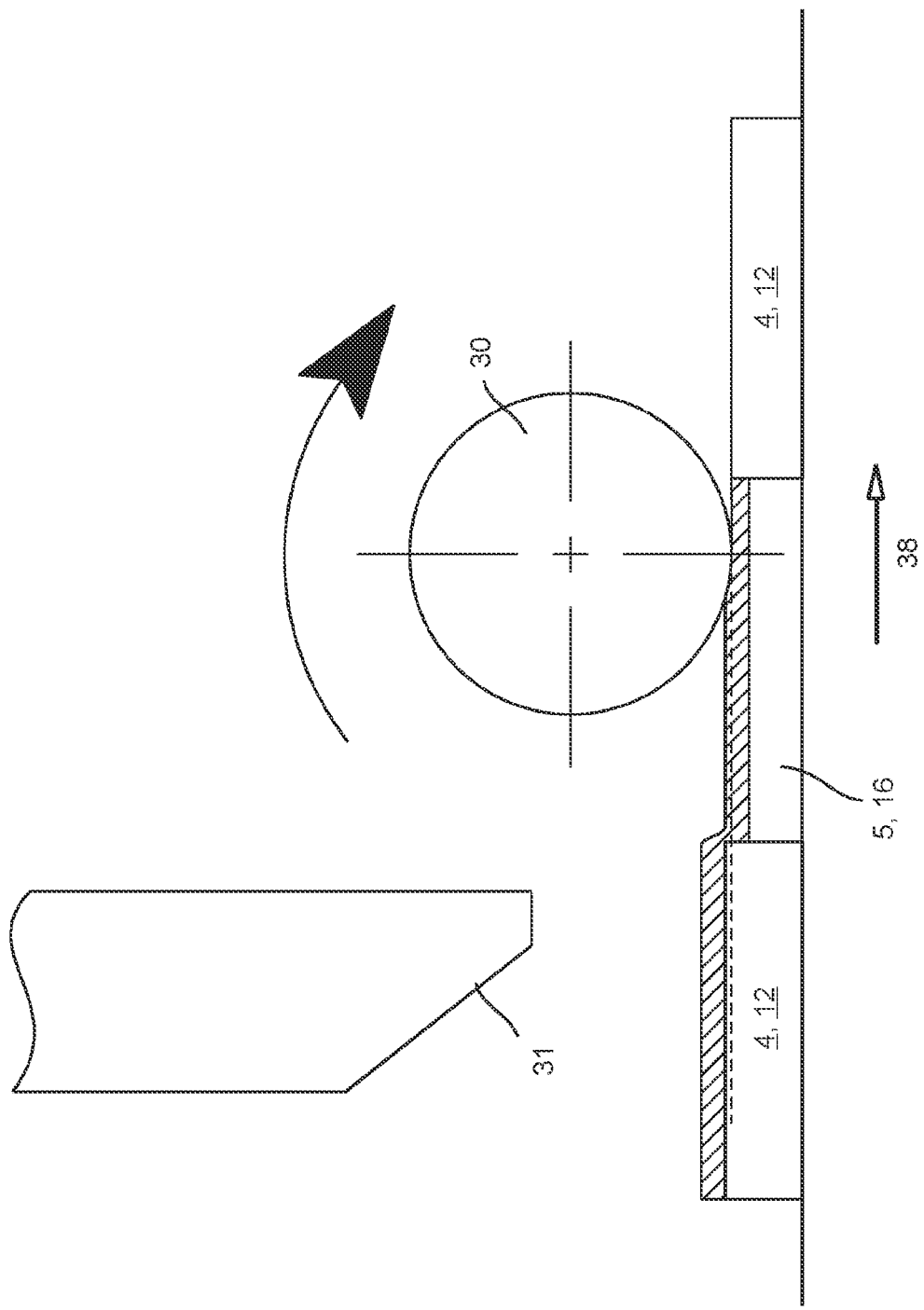

Afterward, in a further method step, regions of the solidified negative mold layer 12 and/or the solidified shaped-object layer 16 and/or solidified second material 5 that is arranged on the negative mold layer are removed by means of a chip-removing or particle-removing milling, grinding or polishing device 30 (FIG. 2C, 6). During this process, regions of the solidified first and/or second material 4, 5 that project beyond a plane arranged at a predetermined distance from the base surface, parallel to it, are removed by means of chip-removing material removal and subsequently suctioned off by means of a suction nozzle 31. If necessary, a surface cleaning device 32 can be arranged behind the suction nozzle 31. This device can comprise a rotating brush for brushing off the material layer of the shaped object that was last applied.

Figure 2E:
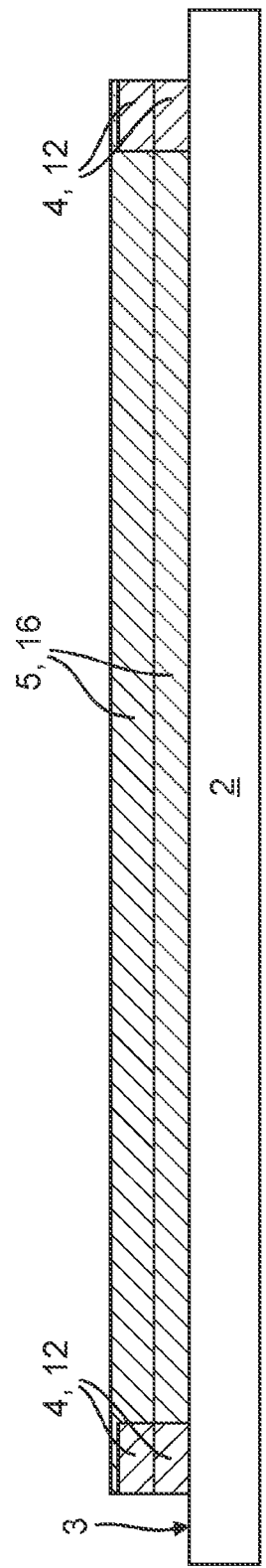
Figure 2F:
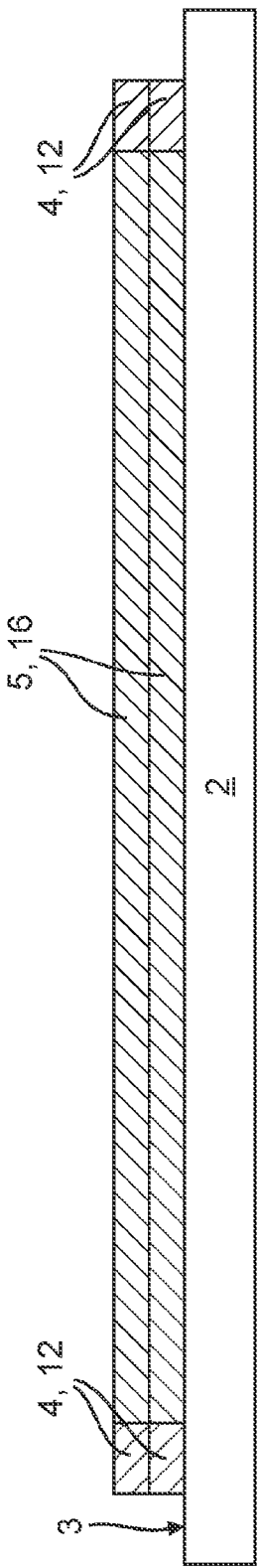
Figure 4:
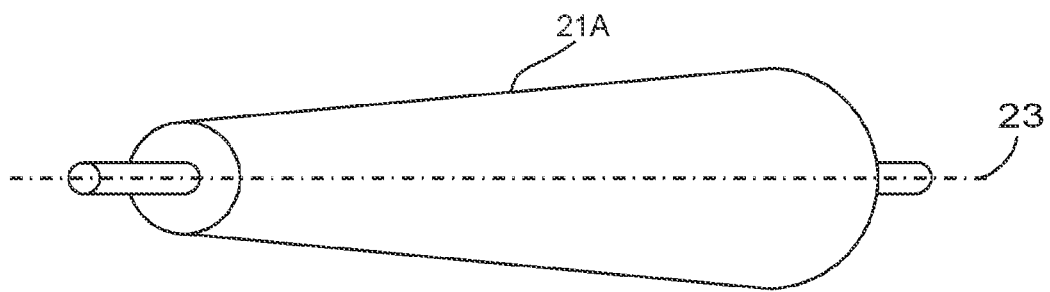
Figure 7:
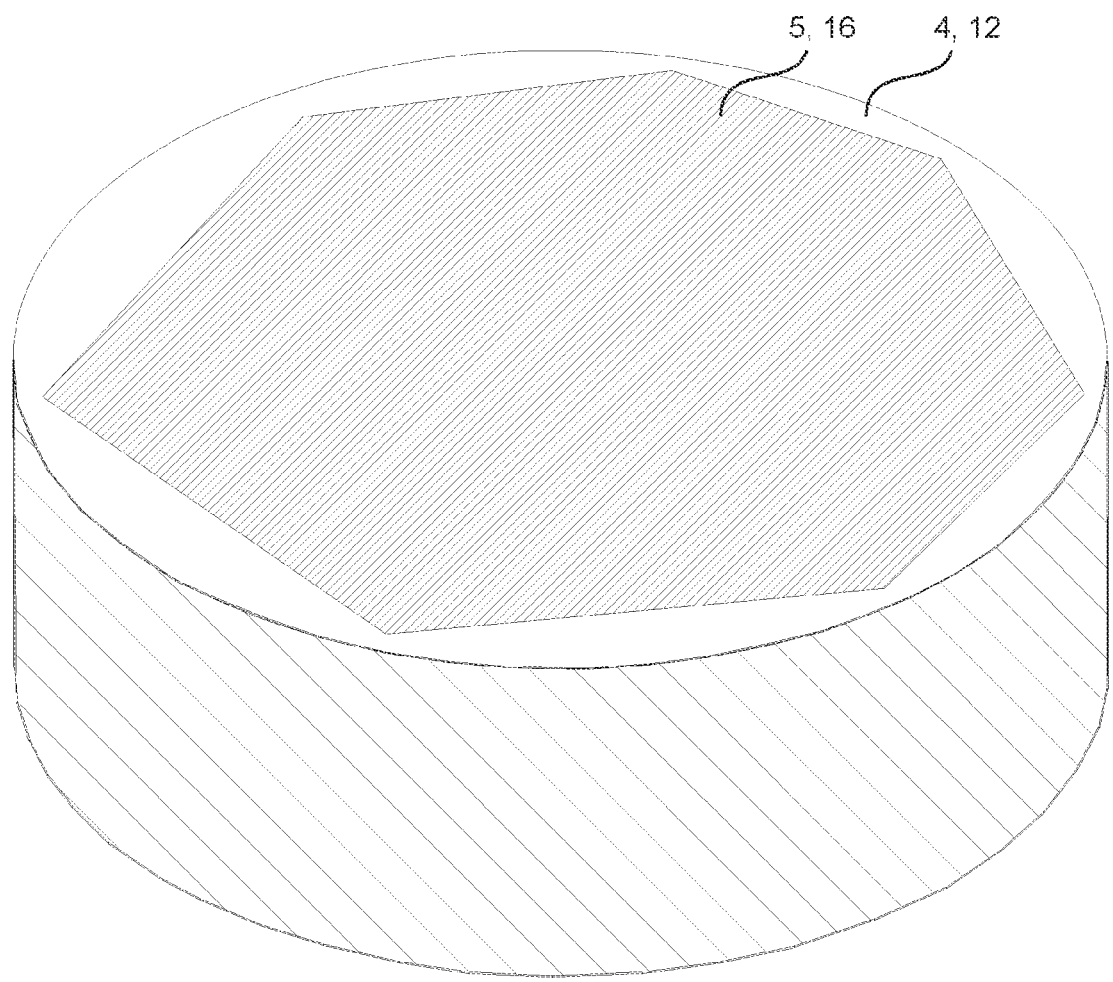
Figure 8:
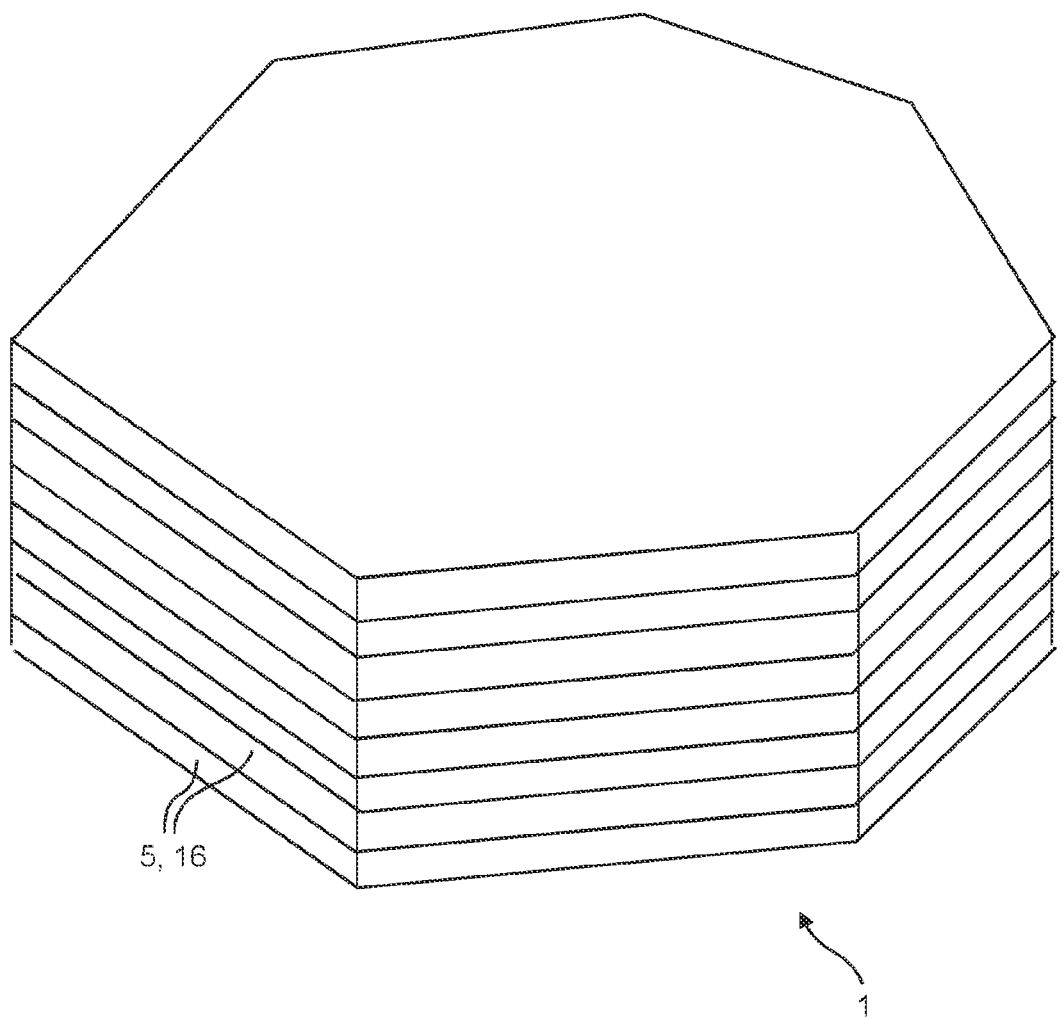

Now a further negative mold layer 12 (FIG. 2D) and a further shaped-object layer 16 are applied to the surface of the solidified negative mold layer 12 and of the shaped-object layer 16 in a corresponding manner (FIG. 2E, 2F). These steps are repeated until all the shaped-object layers 16 of the shaped object to be produced have been produced (FIGS. 7 and 8).

In a further method step, the negative mold layers 12 are brought into contact with the solvent 33, in such a manner that the solidified first material 4 dissolves completely in the solvent. This can be achieved, for example, in that the layer stack consisting of the negative mold layers 12 and the shaped-object layers 16 is immersed in the solvent 33 situated in a container 34 for a predetermined period of time, and treated with ultrasound if necessary. Afterward the finished shaped object (FIG. 8) is removed from the solvent 33 and dried.

Figure 9:
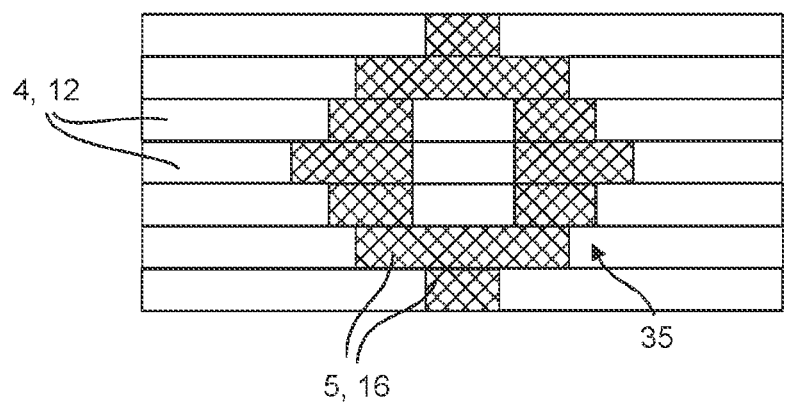
Figure 10:
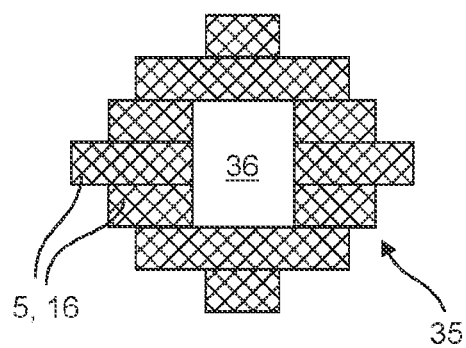

As can be seen in FIGS. 9 and 10, it is also possible to produce shaped objects having overhangs 35 and cavities 36, using the method according to the invention.

In the case of a second exemplary embodiment, a magnetic toner is used in place of the non-magnetic toner. The method is carried out using an apparatus that differs from the apparatus shown in FIGS. 1 and 3, in that it uses the triboelectric charging device 19' shown in FIG. 11 in place of the triboelectric charging device 19 shown in FIG. 5, and a corresponding conical feed roll that is magnetic on its mantle surface in place of the conical feed roll 20A. The magnetic field is generated using locally fixed permanent magnets, which are arranged in the interior of the feed roll 20A. For the remainder, the apparatus that is used for the second exemplary embodiment corresponds to the apparatus according to FIGS. 1 and 3. In this regard, the description of the first exemplary embodiment applies analogously to the second exemplary embodiment.

In the case of the second exemplary embodiment, magnetically conductive carrier particles are made available and brought into contact with the powder particles of the second material 5 in the second reservoir 7, in such a manner that the powder particles remain releasably adhering to the carrier particles. The magnetically conductive carrier particles, with the powder particles adhering to them, are brought into contact with the mantle surface of the feed roll at a location that is at a distance from the roll gap, in such a manner that the carrier particles remain magnetically adhering to the mantle surface of the feed roll, which is shaped as a cone mantle.

Figure 11:
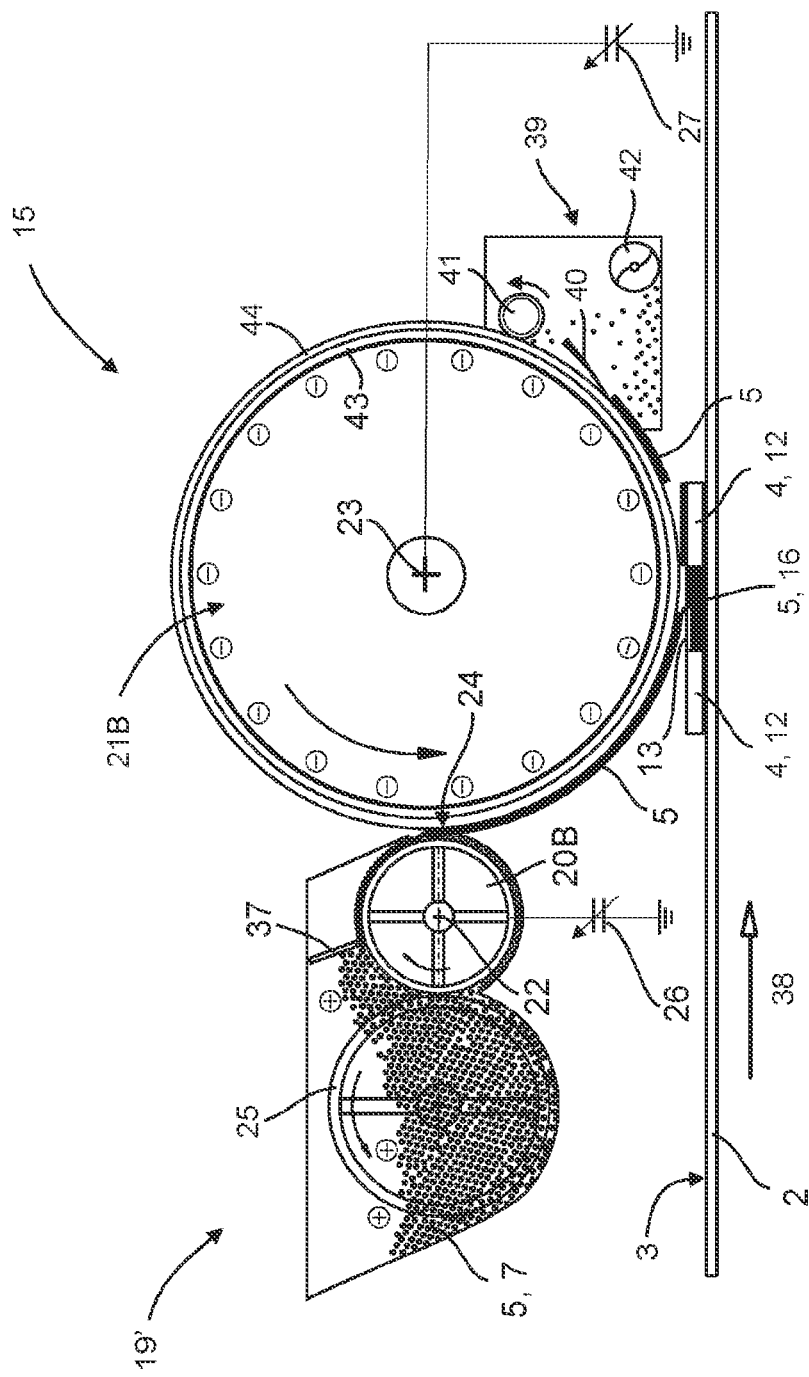

During the rotation of the feed roll about its axis, the carrier particles situated on the mantle surface of the feed roll, with the powder particles adhering to them, are first moved past a stripping device 37, at which the carrier particles, coated with powder particles, are removed from the conical mantle surface of the feed roll. As can be seen in FIG. 11, as a result the mantle surface behind the stripping device 37 is coated with a layer having a defined layer thickness, having the carrier particles and the powder particles situated on them. After having passed through the stripping device 37, the carrier particles coated with the powder particles get into the roll gap formed between the conical feed roll and the conical coating roll 21A.

An electrical potential that deviates from the potential of the powder particles adhering to the carrier particles is applied to the electrically conductive roll core of the coating roll 21A, which potential is selected in such a manner that the powder particles are released from the carrier particles in the roll gap and transferred to the mantle surface of the coating roll 21A. The carrier particles remain on the mantle surface of the feed roll and get back into the region of effect of the stirring units 25, due to the rotational movement of the roll, where they are once again coated with powder particles (toner) of the second material.

Figure 13:
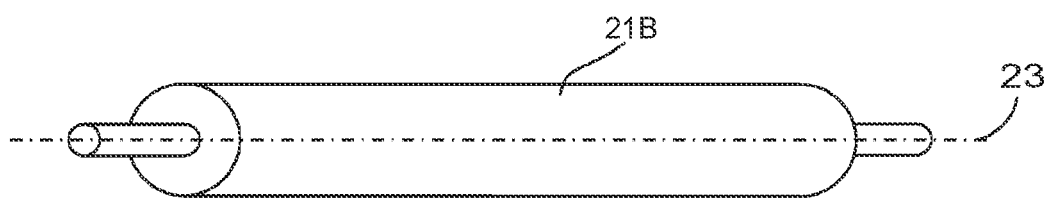
Figure 12:
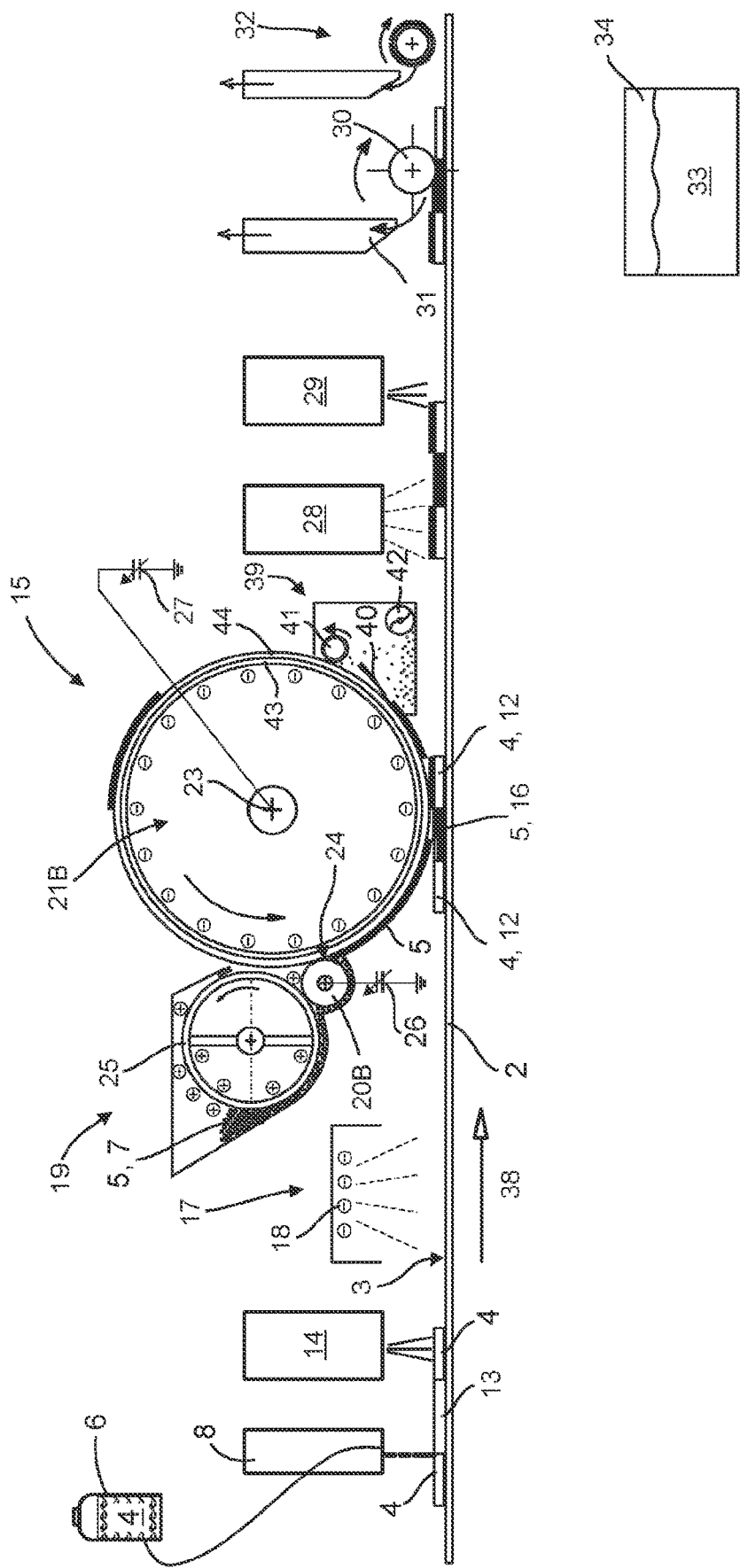

To carry out a third exemplary embodiment, the apparatus shown in FIG. 12 is used, in which the individual processing stations, namely the first dispensing device 8, the solidification device 14, the second dispensing device 15, the heat treatment station 28, if applicable the cross-linking device 29, the chip-removing or particle-removing milling, grinding or polishing device 30 and, if applicable, the surface-cleaning device 32 are arranged one behind the other in a straight line. In the case of the apparatus shown in FIG. 12, not only the feed roll 20B but also the coating roll 21B is structured cylindrically, in each instance (FIG. 13). The coating roll 21B has an electrically conductive layer 43 (roll core) that is coated with an electric insulation layer 44 on its mantle surface.

Differing from the first and second exemplary embodiment, in the case of the third exemplary embodiment the support part 2 having the base surface 3 is not rotated but rather, in order to apply a material layer, a) it is displaced from a starting position, in a transport direction 38, into an end position, and b) afterward—if a further material layer is supposed to be applied—it is displaced from the end position, counter to the transport direction 38, back into the starting position.

Furthermore, the support part 2 is lowered relative to the coating roll, during and/or between Steps a) and b). The steps mentioned above are repeated during each application of a material layer until all the material layers of the shaped object 1 have been layered one on top of the other.

For the remainder, the third exemplary embodiment corresponds to the first exemplary embodiment. The description of the first exemplary embodiment therefore applies analogously to the third exemplary embodiment in this regard.

In the case of a fourth exemplary embodiment, a magnetic toner is used in place of the non-magnetic toner. The method is carried out using an apparatus that differs from the apparatus shown in FIG. 12 in that in place of the triboelectric charging device 19 shown in FIG. 12, a triboelectric charging device 19' similar to FIG. 11 is used, which has a cylindrical feed roll and a cylindrical coating roll. In this regard, the cylindrical feed roll is magnetic on its mantle surface. For the remainder, the apparatus that is used for the fourth exemplary embodiment corresponds to the apparatus according to FIG. 12. In this regard, the description of the third exemplary embodiment applies analogously to the fourth exemplary embodiment. With regard to the description of the charging device 19', reference is made to the description of the second exemplary embodiment.

Figure 15:
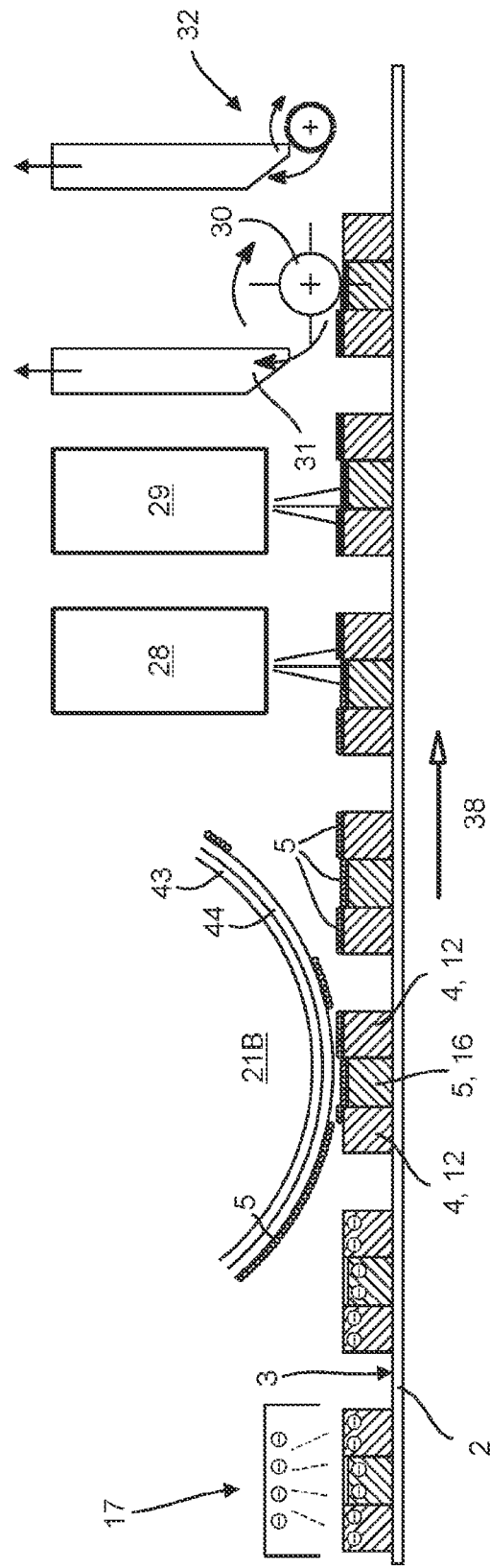

In the case of the first to fourth exemplary embodiment and the fifth exemplary embodiment shown in FIG. 15, the powder-form second material 5 is not only introduced into the cavity 13, using the coating roll 21B, over its full area, but is also applied to the surface of the negative mold layer 12 that faces the coating roll 21B, over its entire area, in each instance. After solidification, the second material 5 applied to the negative mold layer 12 is completely removed, using the chip-removing or particle-removing milling, grinding or polishing device 30. At the same time, material that was applied in the region of the cavity and projects beyond a plane arranged at a predetermined distance from the base surface is removed, so as to achieve a precisely planar surface that extends continuously over the cavity 13 and the negative mold layer 12.

Figure 16:
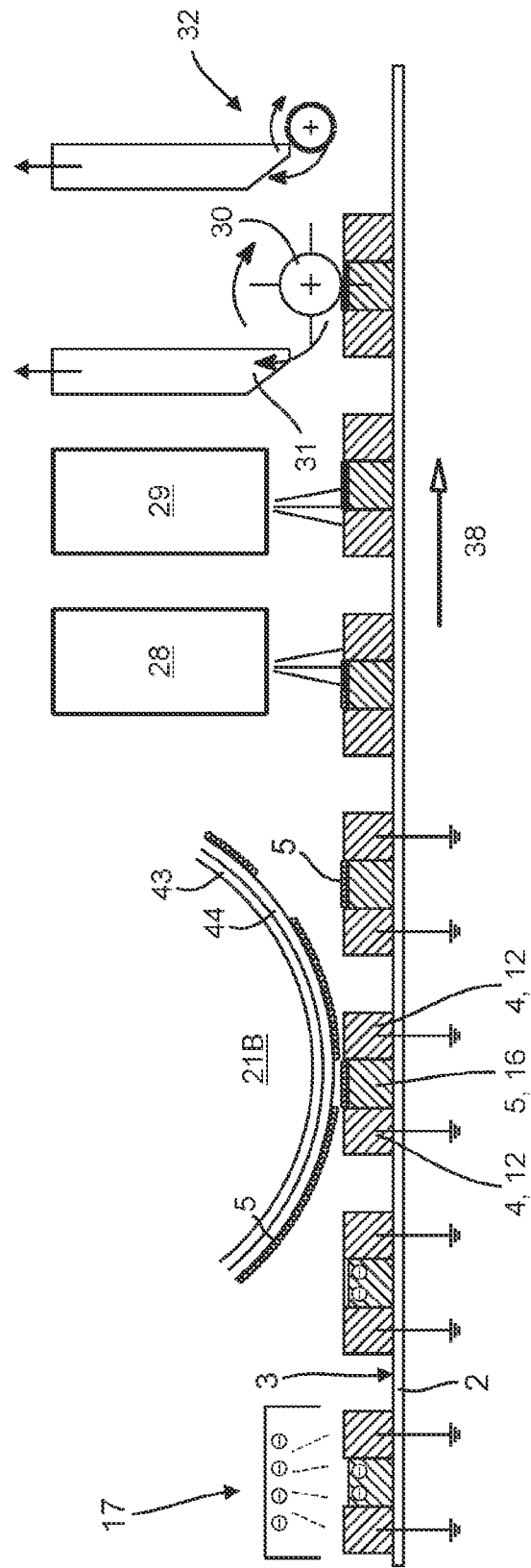

In the case of a sixth exemplary embodiment shown in FIG. 16, the powder-form second material 5 is applied, by means of the coating roll 21B that is coated with this material over the entire area of its mantle surface, only where the cavity 13 is located. The surface of the negative mold layer 12, in contrast, is not coated with the second material 5. As a result, the material consumption of the second material 5 is reduced accordingly.

This is achieved in that an electrically conductive material is used as the first material 4 and an electrically insulating material is used as the second material 5, and that the negative mold layer 12 is set to an electric potential that differs from the electric potential of the powder particles of the second material situated on the mantle surface of the coating roll 21B and from the potential of the electrically conductive layer 43 of the coating roll 21B such that during positioning of the negative mold layer 12 on the mantle surface of the coating roll 21B, practically no powder particles are transferred from the mantle surface to the negative mold layer 12. In the case of the exemplary embodiment in FIG. 16, the negative mold layer 12 is set to ground potential, the electrically conductive layer 43 of the coating roll 21B is set to a negative potential, and the powder particles of the second material 5 are charged to a positive potential.

Figure 17:
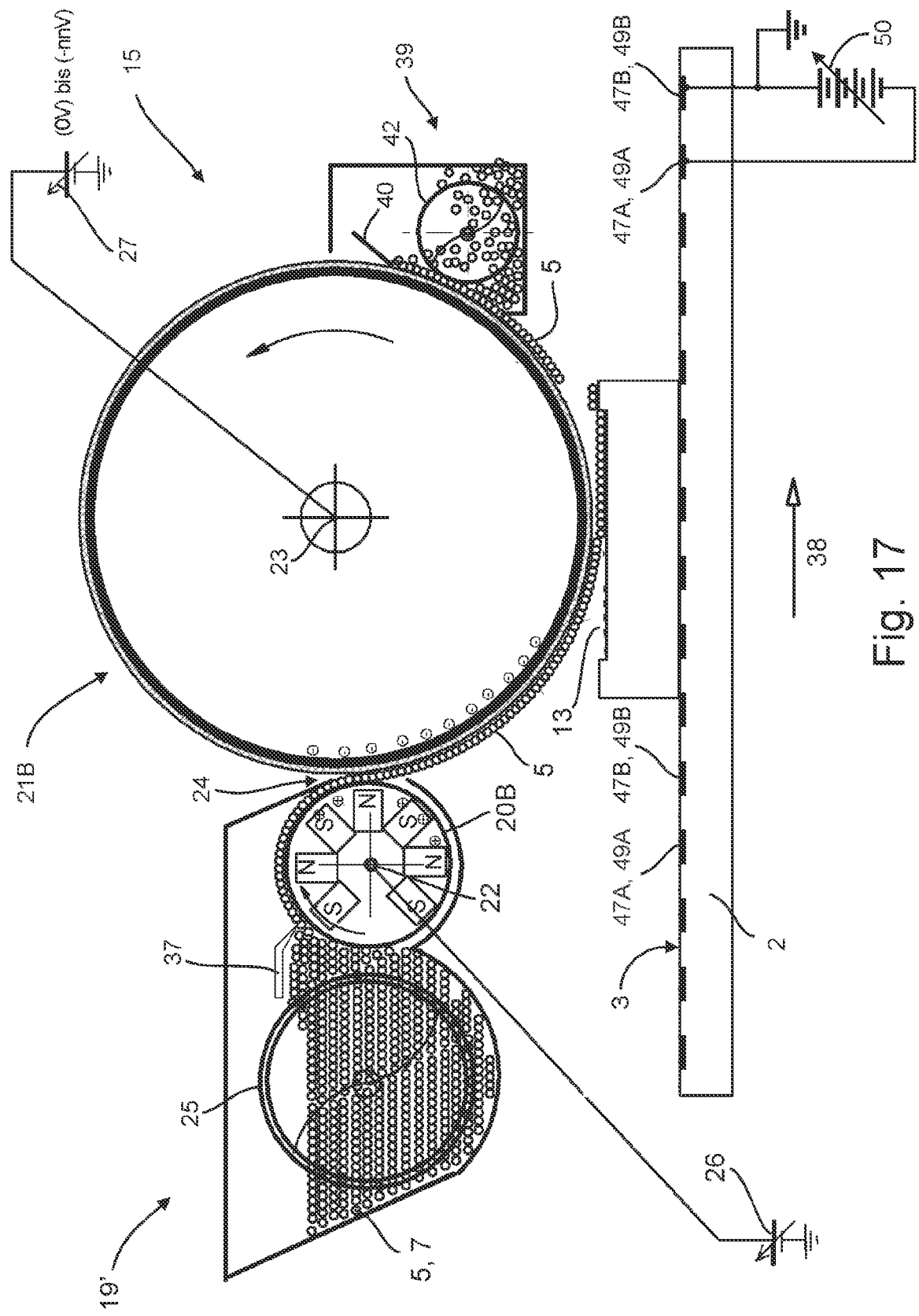
FIGS. 17 and 19 show a longitudinal section of an apparatus that has a charging plate for generating an electric field on a base surface, to which surface material layers are applied, FIG. 18 a top view of a support part structured as a charging plate, and FIG. 20 a partial top view of an apparatus for producing a three-dimensional shaped object, wherein the apparatus has a screw conveying device, by means of which powder particles can be transported from a cleaning device to a developer unit.

In the case of a seventh exemplary embodiment shown in FIG. 17, the electric potential at the base surface 3 is generated using a support part 2 configured as a charging plate that has electrodes 47A, 47B integrated into the support part 2 below the coating roll. In this way, a charging corona is eliminated or it can be optionally switched in.

Figure 18:
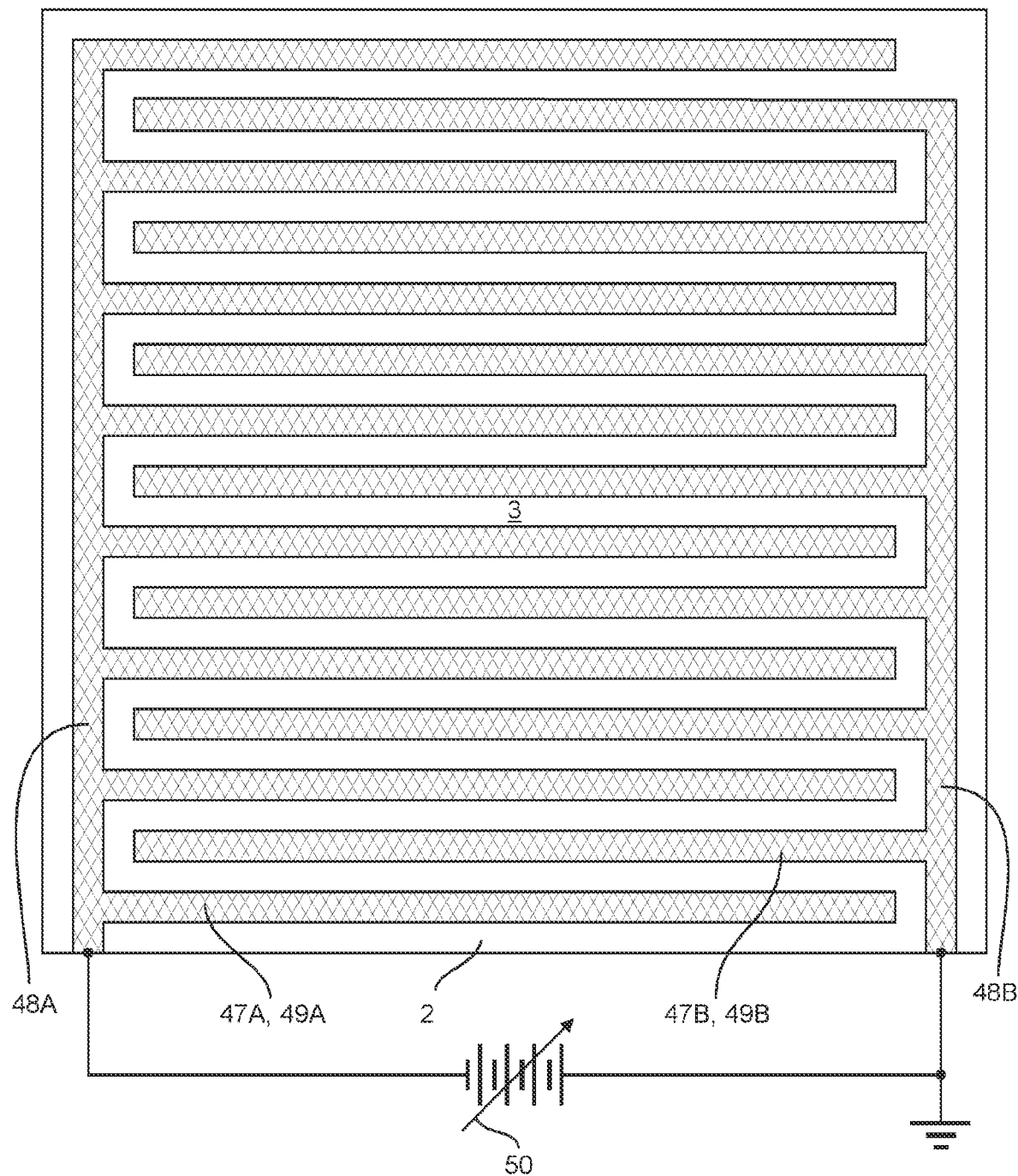

As can be seen in FIG. 18, the electrodes 47A, 47B are each structured in a comb-like manner. Each electrode 47A, 47B has a longitudinal ridge 48A, 48B, on which multiple transverse ridges 49A, 49B that run parallel to one another are arranged, in each instance. The electrodes 47A, 47B run parallel to the base surface 3 and border directly on it or are closely adjacent to it. An electric insulation material is arranged between and/or under the electrodes 47A, 47B, for example casting compound or glass.

A constant electric voltage is applied between the electrodes 47A, 47B, which voltage can be adjusted by means of a fourth setting element 51, preferably to a value between 0 and −45 kV. An electrode 48B is at ground potential. The electric field generated by the voltage penetrates the negative mold layers 12 and the shaped-object layers 16. The first material 4 and the second material 5 each contain dipoles that are oriented in the electric field, approximately parallel to its field lines. In this way powder particles situated on the mantle surface of the coating roll 21B, which get into the transfer gap 47, are electrostatically attracted to the bottom of the cavity 13 in such a manner that they come loose from the mantle surface of the coating roll 21B and settle down onto the bottom of the cavity 13.

As needed, the electric potential at the bottom of the cavity 13 can be measured, for example, using a probe not shown in any detail in the drawing, and compared with a reference value. If a deviation between the measured value and the reference value is determined, the potential that is applied to the electrodes 47A, 47B of the support part 2 is changed in the sense of a reduction in the deviation. The potential at the bottom of the cavity 13 can therefore be regulated to the reference value. In this way, the potential at the bottom of the cavity 13 is prevented from decreasing, in terms of amount, with an increasing number of material layers or negative mold layers applied to the base surface 3, when the distance between the bottom of the cavity 13 and the electrodes 47A, 47B increases.

For the remainder, the seventh exemplary embodiment essentially corresponds to the exemplary embodiment according to FIG. 11. The description of the second exemplary embodiment applies accordingly to the seventh exemplary embodiment in this regard. The coating roll and the feed roll can be structured conically or cylindrically in the case of the seventh exemplary embodiment.

Figure 19:
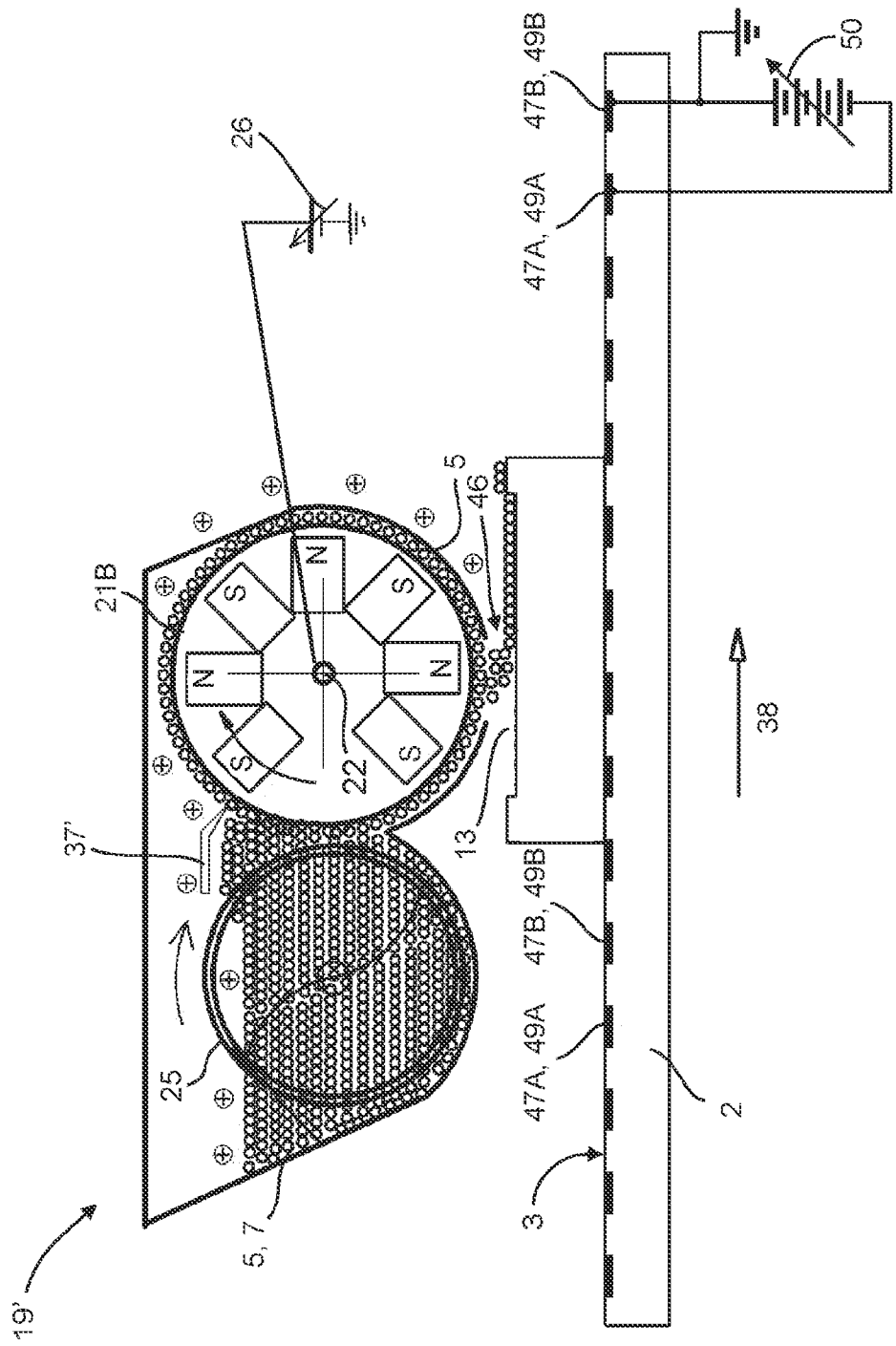
Figure 20:
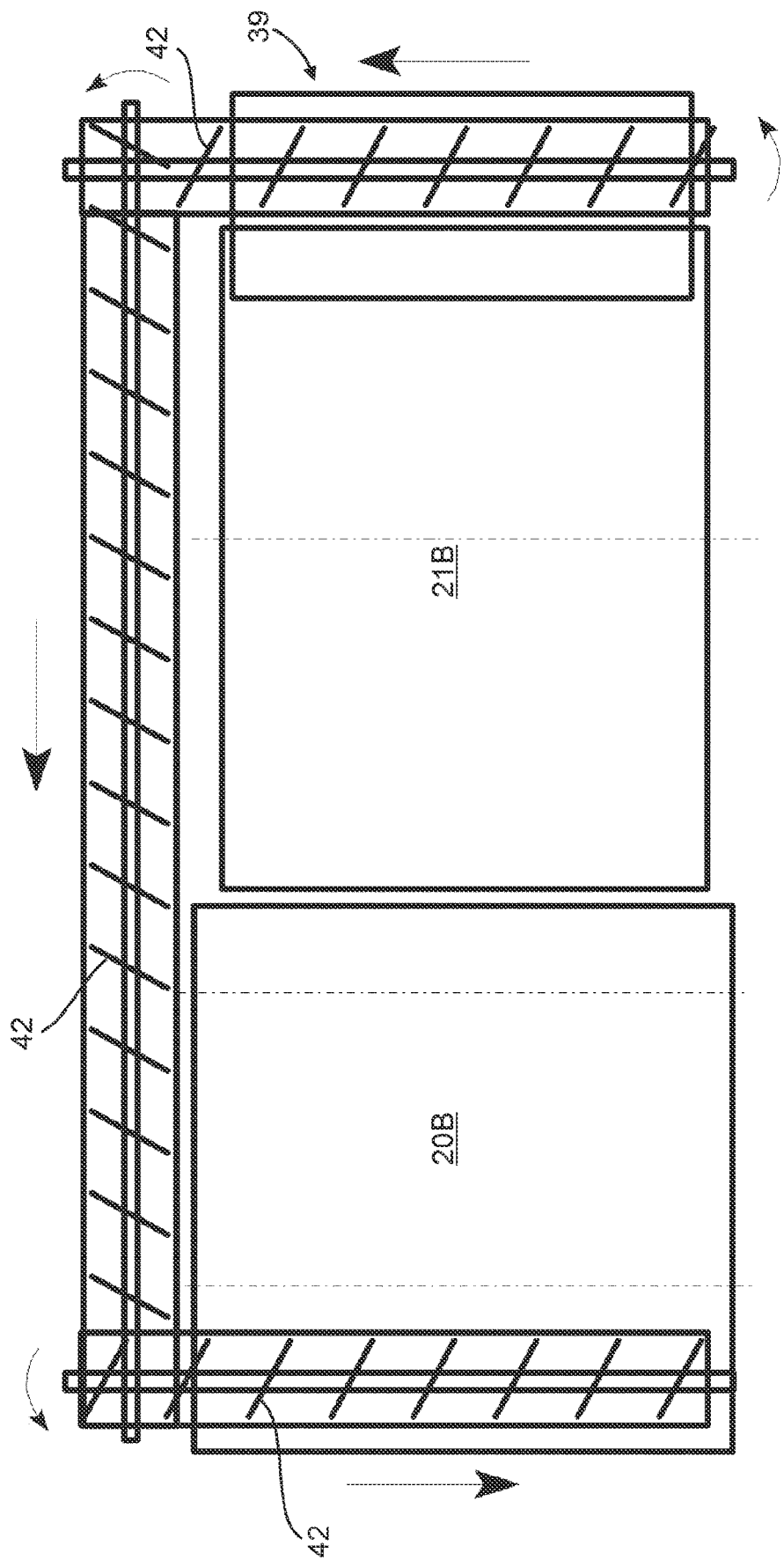

In the case of an eighth exemplary embodiment shown in FIG. 19, magnetically conductive carrier particles are made available in a reservoir 7 and brought into contact with the powder particles of the second material 5, using a stirring unit 25 situated in the reservoir 7, in such a manner that the powder particles remain releasably adhering to the carrier particles. A coating roll 21B having a magnetic mantle surface is made available, which is spaced apart from the bottom of the cavity 13 to be filled with the powder particles by a transfer gap 47.

The magnetic carrier particles with the powder particles adhering to them are brought into contact with the mantle surface of the coating roll 21B at a location spaced apart from the cavity 13, in such a manner that the carrier particles coated with the powder particles remain magnetically adhering to the mantle surface of the coating roll 21B.

The coating roll 21B is rotated about its axis of rotation 22, in such a manner that carrier particles situated on the mantle surface of the coating roll 21B, with the powder particles adhering to them, are first moved past a stripping device 37' to strip off carrier particles coated with powder particles, and after passing through the stripping device 37' they get into the transfer gap 47. Due to the electric field applied between the electrodes 47A, 47B, the powder particles situated on the carrier particles, which get into the transfer gap 47 on the mantle surface of the coating roll, are electrostatically attracted to the bottom of the cavity 13 in such a manner that they come loose from the carrier particles and settle on the bottom of the cavity 13.

For the remainder, the eighth exemplary embodiment essentially corresponds to the seventh exemplary embodiment. In this regard, the description of the seventh exemplary embodiment applies accordingly to the eighth exemplary embodiment.

The invention claimed is:

1. A method for producing a three-dimensional shaped object by means of layer-by-layer material application, wherein geometry data for the shaped object, a support part having a base surface for holding the three-dimensional shaped object, a liquid or flowable first material, which can solidify, a powder-form, thermoplastic second material comprising powder particles, and a solvent in which the solidified first material is soluble are made available,
   a) wherein for the formation of a negative mold layer, material portions of the flowable, liquid or powder-form first material are applied, in accordance with the geometry data, to the base surface and/or to a solidified material layer situated on it, in such a manner that the negative mold layer has at least one cavity on its surface that faces away from the base surface, which cavity has a negative mold of a shaped object layer to be produced,
   b) wherein the negative mold layer is solidified,
   c) wherein at least the bottom of the cavity, formed by the base surface or by a solidified material layer situated on it, is charged to an electric potential having a first polarity,
   d) wherein powder particles of the second material are charged to an electric potential having a second polarity opposite to the first polarity and applied to a support surface of a particle support, over its full area,
   e) wherein the support surface, with the powder particles situated on it, is positioned facing the at least one cavity and relative to the cavity, in such a manner that the powder particles are transferred from the support surface into the cavity, and in it form a shaped object layer having a positive shape that matches the negative mold,
   f) wherein the shaped object layer obtained in this manner is sintered and solidified by means of the effect of heat,
   g) wherein regions of the solidified negative mold layer and/or of the solidified shaped object layer projecting beyond a plane arranged at a predetermined distance from the base surface are removed by means of material removal, in such a manner that a planar surface is produced, which extends over the negative mold layer and the shaped object layer,
   h) wherein Steps a) to g) are repeated at least once, and
   i) wherein afterward, the negative mold layers are brought into contact with the solvent, in such a manner that the solidified first material dissolves in the solvent.

2. The method according to claim 1, wherein the material portions of the first material are applied to the base surface and/or to the solidified negative mold layer situated on it and/or to a solidified shaped object layer by means of a material application printing process, including an inkjet printing process, and that the first material is a material that can be solidified by means of the effect of energy, to which energy is applied for solidifying the negative mold layer.

3. The method according to claim 2, wherein the first material has a working viscosity that is suitable for inkjet printing, which is less than 1000 mPa·s, or less than 100 mPa·s, or less than 30 mPa·s, and less than 20 mPa·s, and is applied to the base surface and/or to the solidified material layer of the three-dimensional shaped object situated on it in the form of liquid droplets having a resolution of at least 180 dpi, or at least 360 dpi, and or at least 720 dpi or 1440 dpi.

4. The method according to claim 1, wherein in Step g) of claim 1, the regions of the solidified negative mold layer and/or of the solidified shaped object layer that project beyond the plane are removed by means of chip-removing or particle-removing material removal, in particular by means of milling, grinding, laser treatment, and cleaning and/or polishing.

5. The method according to claim 1, wherein the powder particles are triboelectrically charged in Step d) of claim 1.

6. The method according to claim 1, wherein the particle support has an electrically conductive layer having an insulation layer situated on it, and that an electric potential having the first polarity is applied to the electrically conductive layer, in such a manner that particles situated on the support surface are electrostatically drawn to it, through the insulation layer.

7. The method according to claim 1, wherein the particle support has an electrically conductive layer having an active layer situated on it, the electric conductivity of which can be changed by means of being exposed to optical radiation, that the active layer is selectively structured by means of an electrophotography process, using an electric potential, that the active layer is afterward brought into contact with the powder particles of the second material, in such a manner that these adhere to the active layer as a function of the structuring of the active layer with the electric potential, and that the active layer, structured with the powder particles in this manner, is positioned on the cavity so as to transfer the powder particles into the cavity.

8. The method according to claim 1, wherein in Step d) of claim 1, the powder particles are charged using a triboelectric charging device that has a reservoir filled with the powder particles, and a stirring unit that stands in contact with the powder particles, which unit is structured and moved relative to the powder particles in such a manner that these are electrically charged.

9. The method according to claim 1, wherein a coating roll is used as the particle support, the mantle surface of which roll serves as a support surface for the powder particles, that the mantle surface is brought into contact, at a first location, with the powder particles having the potential of the second polarity, and the coating roll is rotated about the roll axis of the coating roll, relative to the first location, for full-area coating of the active mantle surface with the powder particles, and that the mantle surface is turned to face the cavity, at a second location coated with the powder particles, which location is offset from the first location in the circumference direction of the mantle surface, and positioned relatively close to the cavity, in such a manner that the powder particles are transferred from the mantle surface into the cavity to form the shaped object layer.

10. The method according to claim 9, wherein powder particles that adhere to a section of the mantle surface of the coating roll, which section lies behind the second location and ahead of the first location in the direction of rotation, are removed from the mantle surface and transported back into the reservoir.

11. The method according to claim 9, wherein a cylindrical roll is used as the coating roll, that the support part that has the base surface
   i) is displaced, for application of a first material layer, proceeding from a starting position, in a forward transport direction relative to the coating roll,
   ii) afterward, it is moved back, relative to the coating roll, into the starting position,
   iii) then, for application of a second material layer, it is displaced once again, relative to the coating roll, in the forward transport direction,
   and that the support part is lowered during and/or between Steps i) to iii), relative to the coating roll.

12. The method according to claim 9, wherein the support part having the base surface is rotated during the material application and, if necessary, during solidification of the materials, about an axis of rotation that is arranged transverse to the cylinder axis of the coating roll, and, if necessary, lowered relative to the coating roll during the rotational movement, and that the coating roll is structured as a conical roll, the roll cross-section of which decreases, proceeding from its end farthest away from the axis of rotation to its other end, which is arranged closer to the axis of rotation.

13. The method according to claim 9, wherein a feed roll for the powder particles is made available, which roll is at a distance from the mantle surface of the coating roll with its mantle surface, by a roll gap, that the feed roll has an electrically conductive feed roll layer on its mantle surface, with an insulation layer situated on it, that an electric potential having the second polarity is applied to the feed roll layer, in such a manner that particles situated on the mantle surface of the feed roll are electrostatically attracted to this layer, that the mantle surface of the feed roll is brought into contact with the powder particles at a location that is at a distance from the roll gap, and the feed roll is rotated about its axis, in such a manner that powder particles situated on the mantle surface of the feed roll get into the roll gap, and that the potential applied to the feed roll layer and the potential applied to the electrically conductive layer of the coating roll are selected in such a manner that the powder particles are transferred in the roll gap, from the mantle surface of the feed roll to the mantle surface of the coating roll.

14. The method according to claim 9, wherein magnetically conductive carrier particles are made available and brought into contact with the powder particles of the second material, in such a manner that the powder particles remain releasably adhering to the carrier particles, that a magnetic feed roll for the powder particles is made available, which is spaced apart from the mantle surface of the coating roll by a roll gap with its mantle surface, that the magnetic carrier particles, with the powder particles adhering to them, are brought into contact with the mantle surface of the feed roll at a location at a distance from the roll gap, in such a manner that the carrier particles remain adhering to the mantle surface of the feed roll magnetically, that the feed roll is rotated about its axis in such a manner that carrier particles situated on the mantle surface of the feed roll, with the powder particles adhering to them, are first moved past a stripping device, to strip off carrier particles coated with powder particles and, after having passed through the stripping device, get into the roll gap, and that the potential of the coating roll is selected in such a manner, in deviation from the potential of the powder particles adhering to the carrier particles, that the powder particles are released from the carrier particles in the roll gap and transferred to the mantle surface of the coating roll.

15. The method according to claim 9, wherein magnetically conductive carrier particles are made available and brought into contact with the powder particles of the second material, in such a manner that the powder particles remain releasably adhering to the carrier particles, that a coating roll having a magnetic mantle surface is made available, which is spaced apart from the bottom of the cavity to be filled with the powder particles by a transfer gap, that the magnetic carrier particles, with the powder particles adhering to them, are brought into contact with the mantle surface of the coating roll at a location that is at a distance from the cavity, in such a manner that the carrier particles remain adhering to the mantle surface of the coating roll magnetically, that the coating roll is rotated about its axis in such a manner that carrier particles situated on the mantle surface of the coating roll, with the powder particles adhering to them, are first moved past a stripping device, to strip off carrier particles coated with powder particles, and after having passed through the stripping device get into the transfer gap, and that the potential of the bottom of the cavity is selected in such a manner, in deviation from the potential of the powder particles adhering to the carrier particles, that the powder particles are released from the carrier particles in the transfer gap and transferred to the bottom of the cavity.

16. The method according to claim 1, wherein preferably an electrically conductive material is used as the first material, and preferably an electrically insulating material is used as the second material, that at least the solidified negative mold layer arranged closest to the support surface of the particle support is brought to an electric potential that differs from the potential of the electrically conductive region of the particle support and from the electric potential of the powder particles of the second material situated on the particle support, in such a manner that during positioning of this negative mold layer on the support surface of the particle support, fewer, in particular 50% fewer, possibly 70% fewer and preferably 90% fewer powder particles per surface unit are transferred to the negative mold layer than per surface unit in at least one cavity of this negative mold layer when the cavity is positioned on the support surface of the particle support.

17. The method according to claim 1, wherein the powder-form second material comprises a photoinitiator, that the thermoplastic powder particles have a polymer and/or copolymer, and that the photoinitiator is activated by means of irradiation with electromagnetic radiation after sintering, so as to cross-link the polymer.

18. The method according to claim 1, wherein the support part has at least two electrodes, which are laterally offset from one another in a top view and engage into one another in a comb-like manner on the base surface, and that an electric voltage is applied to the electrodes, in such a manner that the electric potential having the first polarity occurs at the bottom of the cavity.

19. The method according to claim 18, wherein the electric voltage applied to the electrodes is increased at least once, in terms of amount, between application of the first and application of the last negative mold layer.

20. The method according to claim 18, wherein a measurement signal for the electric potential is detected at the level of the bottom of the cavity and compared with a reference value or a reference value range, and that if a deviation occurs between the measurement signal and the reference value or the reference value range, the electric voltage at the electrodes is changed in the sense of a reduction in the deviation.

\* \* \* \* \*

UNITED STATES PATENT AND TRADEMARK OFFICE
CERTIFICATE OF CORRECTION

PATENT NO. : 12,138,854 B2
APPLICATION NO. : 17/800751
DATED : November 12, 2024
INVENTOR(S) : Hans Mathea Page 1 of 1

It is certified that error appears in the above-identified patent and that said Letters Patent is hereby corrected as shown below:

On the Title Page

Item (71) Column 1, Lines 1-2, Delete "dp polar GmbH, Eggstein-Leopoldshafen (DE)" and insert
-- 3D Systems GmbH, Morfelden-Walldorf (DE) --

Signed and Sealed this
Twenty-eighth Day of January, 2025

Coke Morgan Stewart
*Acting Director of the United States Patent and Trademark Office*